United States Patent
Sugimura et al.

(10) Patent No.: US 7,336,206 B2
(45) Date of Patent: Feb. 26, 2008

(54) INPUT KEY AND INPUT APPARATUS

(75) Inventors: Toshiaki Sugimura, Yokohama (JP); Masaaki Fukumoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 270 days.

(21) Appl. No.: 10/883,713

(22) Filed: Jul. 6, 2004

(65) Prior Publication Data
US 2005/0063757 A1  Mar. 24, 2005

(30) Foreign Application Priority Data
Jul. 8, 2003 (JP) ............................ P2003-193855
Jun. 10, 2004 (JP) ............................ P2004-173064

(51) Int. Cl.
*H03K 17/94* (2006.01)

(52) U.S. Cl. ............................ 341/22; 341/21; 341/26; 341/34; 341/176; 345/168; 345/172

(58) Field of Classification Search .................. 341/22, 341/21, 23, 30, 31, 32, 34; 345/169, 175, 345/168, 170, 174, 176, 158, 160; 400/471, 400/472, 473
See application file for complete search history.

(56) References Cited

U.S. PATENT DOCUMENTS

| 4,680,577 A | * | 7/1987 | Straayer et al. ............. 345/160 |
| 5,269,004 A | * | 12/1993 | Comerford et al. ......... 345/168 |
| 5,528,235 A | * | 6/1996 | Lin et al. ....................... 341/22 |
| 6,683,599 B2 | * | 1/2004 | Shepherd et al. ............ 345/168 |
| 2002/0030668 A1 | * | 3/2002 | Hoshino et al. ............. 345/175 |
| 2002/0033795 A1 | * | 3/2002 | Shahoian et al. ........... 345/156 |
| 2002/0063045 A1 | | 5/2002 | Villain et al. |
| 2003/0193421 A1 | * | 10/2003 | Maatta et al. ................. 341/31 |
| 2004/0041792 A1 | * | 3/2004 | Criscione .................... 345/169 |

FOREIGN PATENT DOCUMENTS

| CN | 1356615 | 7/2002 |
| JP | 7-121290 | 5/1995 |
| JP | 2000-508430 | 7/2000 |

(Continued)

*Primary Examiner*—Jeffery Hofsass
*Assistant Examiner*—Sisay Yacob
(74) *Attorney, Agent, or Firm*—Oblon, Spivak, McClelland, Maier & Neustadt, P.C.

(57) ABSTRACT

An object of the present invention is to provide an input apparatus and input key capable of reducing the number of operations on the input key for input of symbols and permitting a user to designate a symbol to be inputted, by a simpler operation. An input key 10a to which a plurality of symbols or marks are assigned, has a key top 30a to be pushed, a sensor part 32 for detecting a push position on a surface of the key top 30 by a finger or the like used to push the key top 30a, a moving direction detector 34 for detecting a change of the push position of the finger or the like detected by the sensor part 32 and for detecting a moving direction of the finger or the like during movement thereof on the surface of the key top 30, and a switch 40a to change a state with a push on the key top 30, and has a converter 50 for converting a state of the switch 40a and the moving direction detected by the moving direction detector 34, into symbol information.

8 Claims, 36 Drawing Sheets

FOREIGN PATENT DOCUMENTS

| | | |
|---|---|---|
| JP | 2002-91689 | 3/2002 |
| JP | 2003-15805 | 1/2003 |
| JP | 2003-15808 | 1/2003 |
| JP | 2003-157144 | 5/2003 |
| JP | 2003-186608 | 7/2003 |
| KR | 10-2004-0089437 | 10/2004 |
| TW | 513024 | 6/1990 |
| TW | 537488 | 7/1991 |
| TW | 537489 | 7/1991 |
| WO | WO 02/086800 A1 | 10/2002 |
| WO | WO 2004/070599 A1 | 8/2004 |

* cited by examiner

*Fig.6*

| MOVING DIRECTION | SYMBOL |
|---|---|
| STILL | お |
| UP | あ |
| RIGHT | い |
| DOWN | う |
| LEFT | え |
|  |  |

| MOVING DIRECTION | SYMBOL |
|---|---|
| STILL | わ |
| UP | TRANSITION TO SETTING MODE |
| RIGHT | わ |
| DOWN | わ |
| LEFT | わ |
|  |  |

| KEY | DIRECTION | SYMBOL | INPUT COUNT | |
|---|---|---|---|---|
| 210a | STILL | お | 100 | |
| | UP | あ | 70 | |
| | RIGHT | い | 130 | ~53 |
| | DOWN | う | 150 | |
| | LEFT | え | 130 | |
| 210l | STILL | ん | 250 | |
| | UP | ん | 70 | |
| | RIGHT | ん | 30 | |
| | DOWN | ん | 80 | |
| | LEFT | ん | 40 | |

*Fig.15*

| MOVING DIRECTION | SYMBOL |
|---|---|
| STILL | お |
| UP | う |
| RIGHT | い |
| DOWN | あ |
| LEFT | え |

| KEY | DIRECTION | SYMBOL | NUMBER OF PUSHES | |
|---|---|---|---|---|
| | STILL | お | 100 | ~53 |
| | UP | う | 150 ← | |
| 210a | RIGHT | い | 130 | ex1 |
| | DOWN | あ | 70 ← | |
| | LEFT | え | 130 | |
| | STILL | ん | 250 | |
| | UP | ん | 70 | |
| 210l | RIGHT | ん | 30 | |
| | DOWN | ん | 80 | |
| | LEFT | ん | 40 | |

Fig.17A

| MOVING DIRECTION | SYMBOL |
|---|---|
| STILL | お |
| UP | う |
| RIGHT | い |
| DOWN | ん |
| LEFT | え |

| MOVING DIRECTION | SYMBOL |
|---|---|
| STILL | あ |
| UP | ん |
| RIGHT | ん |
| DOWN | ん |
| LEFT | ん |

| KEY | DIRECTION | SYMBOL | NUMBER OF PUSHES |
|---|---|---|---|
| 210a | STILL | お | 100 |
| | UP | う | 150 |
| | RIGHT | い | 130 |
| | DOWN | ん | 250 |
| | LEFT | え | 130 |
| 210l | STILL | あ | 70 |
| | UP | ん | 70 |
| | RIGHT | ん | 30 |
| | DOWN | ん | 80 |
| | LEFT | ん | 40 |

Fig.20

| MARK | KEY | MARK INPUT METHOD | INPUT COUNT |
|------|------|-------------------|-------------|
| #    | 210k | UP                | 120         |
| &    | 210k | RIGHT             | 12          |
| @    | 210k | DOWN              | 130         |
| £    | 210k | 5                 | 130         |
| Å    | 210k | 6                 | 8           |
|      |      |                   |             |

| MOVING DIRECTION | SYMBOL |
|------------------|--------|
| STILL            | を      |
| UP               | #      |
| RIGHT            | &      |
| DOWN             | @      |
| LEFT             |        |

| MARK | KEY | INPUT METHOD | INPUT COUNT | |
|---|---|---|---|---|
| # | 210k | UP | 120 | |
| & | 210k | (5) | 12 | |
| @ | 210k | DOWN ex3 | 130 | |
| £ | 210k | (RIGHT) | 130 | ~54 |
| Å | 210k | 6 | 8 | |
| | | | | |

*Fig.23*

| MOVING DIRECTION | SYMBOL | |
|---|---|---|
| STILL | を | ~52k |
| UP | # | |
| RIGHT | £ | ← NEW ALLOCATION |
| DOWN | @ | |
| LEFT | | |

Fig. 34

| KEY No. | K1 | K2 | K3 | K4 | K5 | K6 | K7 | K8 | K9 | K10 | K11 | K12 |
|---|---|---|---|---|---|---|---|---|---|---|---|---|
| CENTER | あ | か | さ | た | な | は | ま | や | ら | を | ん | DOWNSHIFT |
| UP | い | き | し | ち | に | ひ | み | ゃ | り | ゎ | ゛(JAPANESE COMMA) | CONVERSION TO VOICED CONSONANT |
| DOWN | う | く | す | つ | ぬ | ふ | む | ゅ | る | ー (LONG SOUND) | ゜(JAPANESE PERIOD) | CONVERSION TO P-SOUND |
| LEFT | え | け | せ | て | ね | へ | め | ぇ | れ | ? | 、(COMMA) | CONVERSION TO SMALL KATAKANA |
| RIGHT | お | こ | そ | と | の | ほ | も | よ | ろ | ! | ・(CENTERED DOT) | CONVERSION TO LARGE KATAKANA |

Fig. 35

| KEY No. | K1 | K2 | K3 | K4 | K5 | K6 | K7 | K8 | K9 | K10 | K11 | K12 |
|---|---|---|---|---|---|---|---|---|---|---|---|---|
| CENTER | A | F | K | P | U | Z | ' | . | ? | : | ; | ! |
| UP | B | G | L | Q | V | CR | " | + | @ | { | < | = |
| DOWN | C | H | M | R | W | TAB | . | * | $ | } | > | ~ |
| LEFT | D | I | N | S | X | [ | , | / | ¥ | ( | Back Space | — |
| RIGHT | E | J | O | T | Y | ] | # | % | & | ) | ESC | \| |

Fig.37A

| KEY No. | K1 | K2 | K3 | K4 | K5 |
|---|---|---|---|---|---|
| CENTER | b | h | n | i | z |
| UP | c | j | p | t | zh |
| DOWN | ch | k | q | w | |
| LEFT | f | l | r | x | |
| RIGHT | g | m | s | y | |

Fig.37B

| KEY No. | K1 | K2 | K3 | K4 | K5 | K6 | K7 |
|---|---|---|---|---|---|---|---|
| CENTER | a | e | i | in | ong | ia | uo |
| UP | ai | ei | iang | uai | iu | uan | o |
| DOWN | an | en | uang | ing | ou | ui | u |
| LEFT | ang | eng | iao | ng | u | ue | ue |
| RIGHT | ao | er | ie | iong | ua | un | |

Fig.38

| KEY No. | K1 | K2 | K3 | K4 | K5 | K6 | K7 | K8 |
|---|---|---|---|---|---|---|---|---|
| CENTER | ㄱ | ㅜ | ㄴ | ㄷ | ㅓ | ㅐ | ㅏ | ㅒ |
| UP | ㄸ | ㄹ | ㅁ | ㅂ | ㅗ | ㅖ | ㅜ | ㅠ |
| DOWN | ㅃ | ㅅ | ㅆ | ㅇ | ㅛ | ㅑ | ㅒ | ㅛ |
| LEFT | ㅈ | ㅉ | ㅊ | ㅠ | ㅜ | ㅏ | ㅠ | ㅞ |
| RIGHT | ㅌ | ㅍ | ㅎ | ㅓ | ㅡ | ㅠ | ㅡ | ㅢ |

163

INPUT KEY AND INPUT APPARATUS

BACKGROUND OF THE INVENTION

1. Field of the Invention

The present invention relates to an input key to which a plurality of input information elements are assigned, and an input apparatus for inputting information by the input key.

2. Related Background Art

A portable terminal such as a cell phone needs to be compact enough for a user to carry. For this reason, where a cell phone is provided with a keyboard, the number of input keys in the keyboard is often much smaller than that in a so-called full keyboard.

In the portable terminals, therefore, it is common practice to assign an input key a plurality of symbols and designate a symbol to be inputted, by the number of pushes on one input key. For example, one push on a key results in inputting "あ" in Japanese, and two pushes result in inputting "い" in Japanese.

By adopting the technique of this type, it is feasible to input numerous symbols, such as Japanese hiragana writing symbols and katakana writing symbols, even in electronics equipment with the small number of input keys like the portable terminals.

However, this conventional technique required two or more pushes on an input key for input of a symbol and tended to complicate the operation to designate symbols such as the Japanese hiragana writing symbols and katakana writing symbols. Among them, Japanese "お" required five pushes on an input key for input thereof. In the portable terminals, therefore, the operation to input symbols became cumbersome works in certain cases.

In order to solve the above problem, there were a variety of proposals heretofore.

For example, concerning the touch type keys, there is a disclosed technology of displaying a plurality of symbols on a key top displayed on a screen and designating a symbol by sliding a pen on the key 2003-15808). This is an example of the technology so called "softkey", "software key", "software keyboard", and so on. In this conventional technology, a plurality of key pictures are displayed on the display screen of an electronics device and a user performs an operation as if to "push" a picture out of them, thereby inputting a symbol of that key.

There was another technology about input apparatus in a portable terminal in which number buttons and a direction button (up, down, left, right, and center) are spaced from each other (e.g., cf. Japanese Patent Application Laid-Open No. 2003-15805). In this conventional technology, a "line group" (the あline group, the かline group, etc.) of the "hiragana writing symbols" is selected by a push of a number button, and a symbol in the selected "line group" is designated by a push of the direction button.

It is described that the number of symbol input operations can be decreased by each of the above-described conventional technologies.

SUMMARY OF THE INVENTION

However, since the input apparatus described in the aforementioned Japanese Patent Application Laid-Open No. 2003-15808 is sort of a virtual keyboard, it is difficult to gain a click feeling upon a push of a key. Since a fingertip does not sense the shape of the key top, it is also difficult to perform the key operation by so-called touch typing.

In this conventional technology, it is also conceivable to adopt a configuration in which a predetermined symbol input confirmation sound is generated upon a push, instead of the physical sense at the fingertip. When the symbol input confirmation sound is generated, the user can recognize a push of an input key if in a quiet location. In noisy environments with traffic or the like, it is hard for the user to catch the symbol input confirmation sound or the like. Furthermore, there are also conceivable cases where use is hardly possible at places where the generation of sound is regulated.

Incidentally, in the case of the compact electronics devices like the portable terminals, the user has to hold the cell phone by some fingers, and thus use of all the fingers for input of symbols will lead to considerable difficulties. For this reason, it is often the case in the portable terminals such as cell phones that symbols are inputted by one finger. If this symbol input by one finger were implemented in the configuration as described in the aforementioned Japanese Patent Application Laid-Open No. 2003-15805, the same finger would have to move back and forth between the number buttons and the direction button spaced from each other, and it must be a cumbersome work.

The present invention has been accomplished in order to solve the problems as described above, and an object of the invention is to provide an input key and input apparatus capable of reducing the number of operations on an input key in input of symbols and permitting the user to designate a symbol to be inputted, by a simpler operation.

In order to achieve the above object, an input key according to the present invention is an input key to which a plurality of input information elements are assigned, the input key comprising: a key top to be pushed; moving direction detecting means for detecting a moving direction of a pusher of a finger or the like in contact with a surface of the key top during movement thereof on the key top surface; and a switch to change a state with a push on the key top. The "input information elements" embrace information of symbols, numbers, marks, etc., information of the line feed code, control code, etc., and information generally assigned to each input key in the so-called full keyboard.

With this input key, a push on the key top can be detected by a state change of the switch, and the moving direction detecting means detects the moving direction of the pusher moving on the key top surface, thereby obtaining the input information corresponding to the moving direction. Namely, the detection of the push on the key top and the detection of input information can be substantialized by only a simple operation to move the pusher on the key top surface, whereby it becomes feasible to reduce the number of operations on the input key in input of information and to designate information to be inputted, by a simpler operation.

In a desired configuration, the moving direction detecting means comprises: light emitting means for emitting light toward the pusher moving on the key top surface; light receiving means for receiving light reflected from the moving pusher; and direction detecting means for detecting the moving direction of the pusher, based on a physical characteristic of the light emitted from the light emitting means and a physical characteristic of the light received by the light receiving means.

In another desired configuration, the moving direction detecting means comprises: at least one rotating portion of substantially spherical shape projecting on the key top surface and held so as to be rotatable by contact with the pusher; rotation amount measuring means for measuring an amount of rotation of the rotating portion rotated by movement of the pusher on the key top surface; and direction detecting means for detecting the moving direction of the pusher, based on the amount of rotation of the rotating portion.

In a desired configuration of the input key, projections to generate vibration or sound by contact with the pusher are formed in a plurality of predetermined regions on the key top surface and the projections in the respective predetermined regions are configured to have mutually different natural frequencies of generated vibration or sound; and the moving direction detecting means comprises: measuring means for measuring a natural frequency of vibration or sound generated from the projection in at least one predetermined region with movement of the pusher on the key top surface; and direction detecting means for detecting the moving direction of the pusher, based on the natural frequency obtained by the measurement.

In a desired configuration of the input key, projections to generate vibration or sound by contact with the pusher are formed in a plurality of predetermined regions on the key top surface; and the moving direction detecting means comprises: measuring means for measuring a magnitude of vibration or sound generated from the projection in at least one predetermined region with movement of the pusher on the key top surface; and direction detecting means for detecting the moving direction of the pusher, based on the magnitude of the vibration or sound obtained by the measurement.

In a desired configuration of the input key, projections to generate vibration or sound by contact with the pusher are formed in a plurality of predetermined regions on the key top surface, and back projections to generate vibration or sound due to the vibration or sound generated by the projections are formed in regions corresponding to the predetermined regions, in a back surface of the key top, the back projections in the respective regions being configured to have mutually different natural frequencies of generated vibration or sound; and the moving direction detecting means comprises: measuring means for measuring a natural frequency of vibration or sound generated from the back projection in at least one region due to vibration or sound generated from the projection in at least one predetermined region with movement of the pusher on the key top surface; and direction detecting means for detecting the moving direction of the pusher, based on the natural frequency obtained by the measurement.

Furthermore, in a desired configuration of the input key, static electricity generators to generate static electricity by contact with the pusher are formed in a plurality of predetermined regions on the key top surface; and the moving direction detecting means comprises: measuring means for measuring an amount of static electricity generated from the static electricity generator in at least one predetermined region with movement of the pusher on the key top surface; and direction detecting means for detecting the moving direction of the pusher, based on the amount of static electricity obtained by the measurement.

Incidentally, the input key according to the present invention can also adopt the following configuration. Namely, another input key according to the present invention is an input key to which a plurality of input information elements are assigned, the input key comprising: a key top to be pushed; position detecting means for detecting a push position on a surface of the key top, of a pusher of a finger or the like used to push the key top; moving direction detecting means for detecting a moving direction of the pusher during movement of the pusher on the key top surface, based on a change of the push position of the pusher detected by the position detecting means; and a switch to change a state with a push on the key top.

With this input key, a push on the key top can be detected by a state change of the switch, a push position on the key top surface by the pusher is detected, and a moving direction of the pusher on the key top surface is detected based on a change of the push position, to obtain the input information corresponding to the moving direction. Namely, the detection of the push on the key top and the detection of the input information can be substantialized by only a simple operation to move the pusher on the key top surface, whereby it becomes feasible to reduce the number of operations on the input key in input of information and to designate information to be inputted, by a simpler operation.

The input key according to the present invention can also adopt the following configuration. Namely, still another input key according to the present invention is an input key to which a plurality of input information elements are assigned, the input key comprising: a key top to be pushed; position detecting means for detecting a push position on a surface of the key top, of a pusher of a finger or the like used to push the key top; a switch to change a state with a push on the key top; and push direction determining means for determining a direction of a push, based on the push position of the pusher detected by the position detecting means, in a predetermined time after a change in the state of the switch.

The position detecting means herein can be configured to detect a barycentric position of the push by the pusher, as the push position. Namely, the push position on the key top surface detected by the position detecting means is a broad concept embracing the "barycentric position of the push". The push position can be detected as follows: where the pusher (e.g., a finger) covers the entire surface or almost entire surface of the key top upon a push on the key top thereby, the "barycentric position of the push" is detected as the push position, for example, by a touch pad or the like.

Then the push direction determining means determines the direction of the push, based on the push position of the pusher detected by the position detecting means, in the predetermined time after the change in the state of the switch. The "push position of the pusher detected by the position detecting means, in the predetermined time after the change in the state of the switch" herein is a concept also embracing a push position detected without movement of the pusher (unchanged push position itself), as well as the change of the push position detected with movement of the pusher. Namely, the push direction determining means determines the direction of the push by the change of the push position or by the push position itself. This "direction of the push" is a broad concept meaning the direction of the change (moving direction of the push position) in the case where the push position changes, and meaning a relative location of the push position on the key top surface in the case where the push position is unchanged. For example, in a case where the push position is unchanged near an upper end on the key top surface, the direction of the push is determined to be "upward".

In this manner the detection of the push on the key top and the detection of input information can be substantialized, not only by the operation to move the push position (also embracing the barycentric position) of the pusher, but also by only the simple operation to push the key while keeping the push position at a certain location on the key top surface for the predetermined time, whereby it is feasible to reduce the number of operations on the input key in input of information and to designate information to be inputted, by a simpler operation.

In order to achieve the above object, an input apparatus according to the present invention is an input apparatus for inputting information by an input key to which a plurality of input information elements are assigned, the input apparatus comprising: the input key comprising a key top to be pushed; moving direction detecting means for detecting a moving direction of a pusher of a finger or the like in contact with a surface of the key top during movement thereof on the key top surface; and a switch to change a state with a push on the key top; and converting means for converting a state of the switch and the moving direction detected by the moving direction detecting means, into input information.

With this input apparatus, a push on the key top can be detected by the state change of the switch in the input key, and the moving direction detecting means detects the moving direction of the pusher on the key top surface, thereby obtaining the input information corresponding to the moving direction. Namely, the detection of the push on the key top and the detection of input information can be substantialized by only the simple operation to move the pusher on the key top surface, whereby it becomes feasible to reduce the number of operations on the input key in input of information and to designate information to be inputted, by a simpler operation.

Another input apparatus according to the present invention is an input apparatus for inputting information by an input key to which a plurality of input information elements are assigned, the input apparatus comprising: the input key comprising: a key top to be pushed; position detecting means for detecting a push position on a surface of the key top, of a pusher of a finger or the like used to push the key top; moving direction detecting means for detecting a moving direction of the pusher during movement of the pusher on the key top surface, based on a change of the push position of the pusher detected by the position detecting means; and a switch to change a state with a push on the key top; and converting means for converting a state of the switch and the moving direction detected by the moving direction detecting means, into input information.

With this input apparatus, a push on the key top can be detected by the state change of the switch in the input key, the position detecting means detects the push position on the key top surface by the pusher, and the moving direction detecting means detects the moving direction of the pusher on the key top surface on the basis of the change of the push position, thereby obtaining the input information corresponding to the moving direction. Namely, the detection of the push on the key top and the detection of the input information can be substantialized by only the simple operation to move the pusher on the key top surface, whereby it becomes feasible to reduce the number of operations on the input key in input of information and to designate information to be inputted, by a simpler operation.

Each of the above input apparatus is preferably configured to comprise a plurality of input keys and configured so that the converting means comprises conversion tables provided for the respective input keys and each storing a correlation of the moving direction of the pusher with the input information, and rewriting means for rewriting the conversion tables.

With these means, it is feasible to change the conversion tables storing the correlations of the moving direction with input information in accordance with need.

Each of the above input apparatus is also preferably configured to comprise a plurality of input keys, and configured so that the converting means comprises conversion tables provided for the respective input keys and each storing a correlation of the moving direction of the pusher with the input information; tallying means for tallying an input count of input information; and rewriting means for rewriting the conversion tables so that when a tally result of the input count by the tallying means is that an input count of first information assigned to a first moving direction of a first input key is larger than an input count of second information assigned to a second moving direction of a second input key easier to be pushed than the first moving direction of the first input key, the first information is assigned to the second moving direction of the second input key.

With these means, the conversion tables can be changed so that a symbol or mark with a larger input count is assigned to an input key easier to be pushed, according to the tally result of the input count of the symbol or mark.

Each of the above input apparatus is also preferably configured to comprise a plurality of input keys, and configured so that the converting means comprises conversion tables provided for the respective input keys and each storing a correlation of the moving direction of the pusher with the input information; tallying means for tallying an input count of input information; and registering means for performing such registration that when a tally result of the input count by the tallying means is that an input count of third information not registered on the conversion tables is larger than an input count of fourth information registered on the conversion tables, the third information is registered instead of the fourth information on the conversion tables.

With these means, the conversion tables can be changed so that information with a large input count, which is not registered on the conversion tables, is registered on the conversion tables in accordance with the tally result of the input count of information.

Furthermore, still another input apparatus according to the present invention is an input apparatus for inputting information by an input key to which a plurality of input information elements are assigned, the input apparatus comprising: the input key comprising: a key top to be pushed; position detecting means for detecting a push position on a surface of the key top, of a pusher of a finger or the like used to push the key top; a switch to change a state with a push on the key top; and push direction determining means for determining a direction of a push, based on the push position of the pusher detected by the position detecting means, in a predetermined time after a change in the state of the switch; and converting means for converting a state of the switch and the direction of the push determined by the push direction determining means, into input information.

With this input apparatus, a push on the key top can be detected by the state change of the switch in the input key, the position detecting means detects the push position on the key top surface by the pusher, and the push direction determining means determines the direction of the push, based on the push position of the pusher detected by the position detecting means, in the predetermined time after the change in the state of the switch, thereby obtaining the input information corresponding to the direction of the push. Namely, the detection of the push on the key top and the detection of the input information can be substantialized, not only by the operation to move the push position (also embracing the barycentric position) of the pusher, but also by only the simple operation to push the key while keeping the push position at a certain location on the key top surface for the predetermined time, whereby it becomes feasible to reduce the number of operations on the input key in input of information and to designate information to be inputted, by a simpler operation.

Incidentally, in a desired configuration of the input apparatus according to the present invention, the input apparatus further comprises controlling means for, during a push operation on an input key, outputting assignment information of a plurality of input information elements to the input key at a time of the operation, to an external display device and for making the display device highlight information of an input candidate corresponding to the push operation at the time, out of the plurality of input information elements.

This achieves the following three effects. Namely, (1) in a case where the assignment of the plurality of input information elements to the input key is changed according to frequencies of use or the like, the user can check the up-to-date assignment information on the external display device during a push operation on the input key. (2) For example, in a case where the input mode is switched from an input mode of Japanese hiragana writing symbols to an alphabet input mode, it is feasible to feed back to the user the assignment information of input information about the input mode after the switch, which cannot be readily displayed by only the display on the key top. Furthermore, (3) the user can also check the information as an input candidate corresponding to a push operation at the time of the operation (information selected at the time). The feedback function of up-to-date assignment information as described above can dramatically improve easiness and certainty of user operation.

As detailed above, the present invention succeeded in reducing the number of operations on the input key in symbol input and permitting the user to designate a symbol to be inputted, by a simpler operation.

BRIEF DESCRIPTION OF THE DRAWINGS

FIG. 4 is an explanatory diagram showing an appearance configuration of a key top 30a in an input key 10a.

FIG. 6 is an explanatory diagram showing a conversion table (corresponding to input key 10a).

FIG. 8 is an explanatory diagram showing a conversion table corresponding to an input key 210j.

FIG. 14 is an explanatory diagram showing an example of a tally table constructed by a converter.

FIG. 15 is an explanatory diagram showing a conversion table constructed by a converter.

FIG. 16 is an explanatory diagram showing an example of a tally table constructed by a converter.

FIG. 17A is an explanatory diagram showing an example of a conversion table for input key 210a.

FIG. 17B is an explanatory diagram showing an example of a conversion table for input key 210l.

FIG. 18 is an explanatory diagram showing another example of a tally table constructed by a converter.

FIG. 20 is an explanatory diagram showing an example of a mark tally table before exchange of mark input directions.

FIG. 21 is an explanatory diagram showing an example of a conversion table before mark assignment exchange.

FIG. 22 is an explanatory diagram showing an example of a mark tally table after exchange of mark input directions.

FIG. 23 is an explanatory diagram showing an example of a conversion table after mark assignment exchange.

FIG. 34 is a table showing an example of assignment of Japanese hiragana writing symbols and marks to each of keys.

FIG. 35 is a table showing an example of assignment of English alphabet symbols and marks to each of keys.

FIG. 37A is a table showing an example of assignment of Chinese 声母(consonants) to each of keys.

FIG. 37B is a table showing an example of assignment of Chinese 韻母(vowels) to each of keys.

FIG. 38 is a table showing an example of assignment of Korean symbols to each of keys.

DESCRIPTION OF THE PREFERRED EMBODIMENTS

Embodiments of the present invention will be described below. The same elements will be denoted by the same reference symbols, without redundant description.

First Embodiment

The present embodiment will describe a keyboard input apparatus (hereinafter referred to as "input apparatus") 100 provided in a portable terminal. This input apparatus 100 has a plurality of input keys 10 and is applied to mobile communication terminal equipment such as cell phones, and to portable electronics equipment such as PDA (Personal Digital Assistant).

(Overall Configuration of Input Apparatus)

Figure 1:
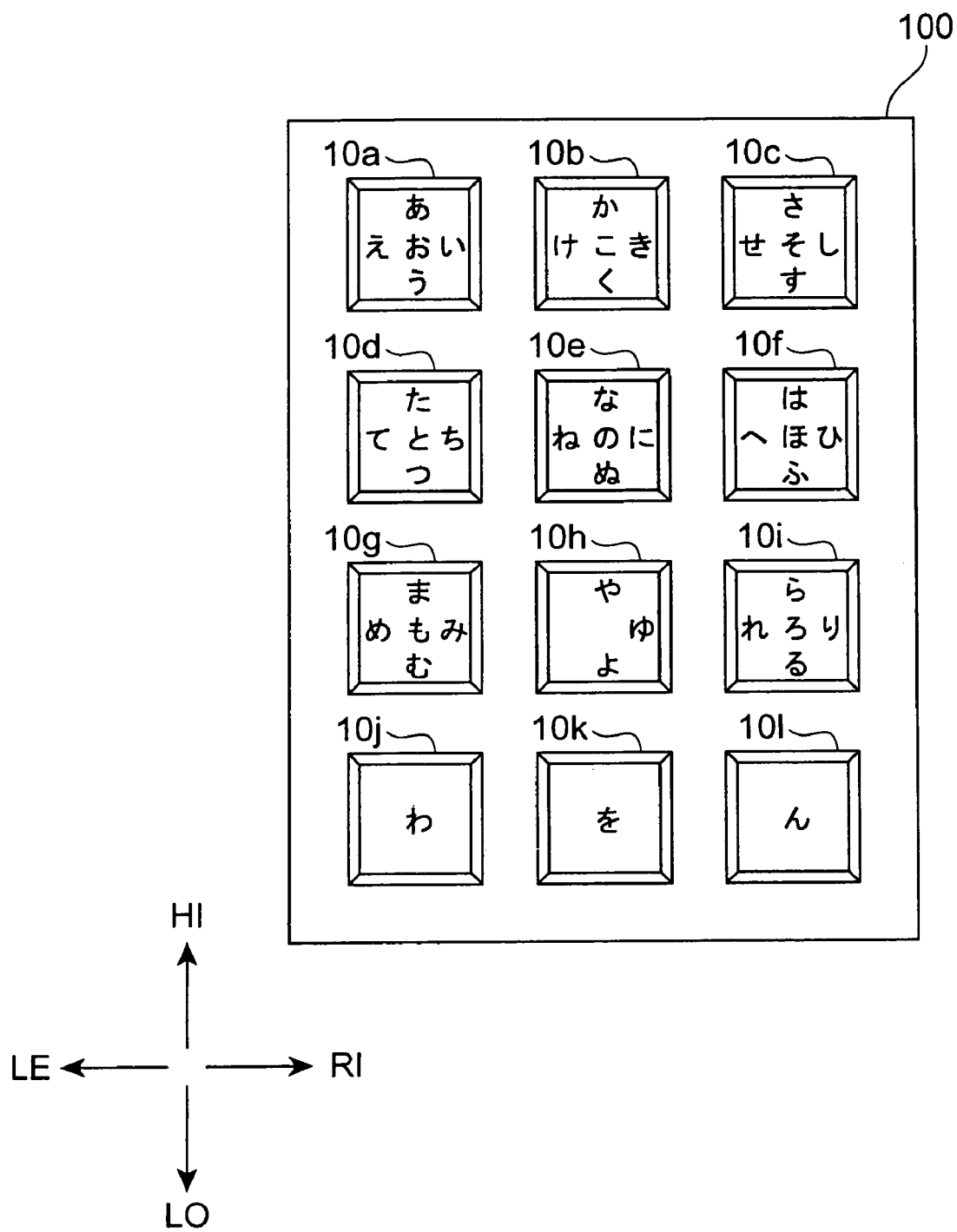
FIG. 1 is a plan view showing the appearance of an input apparatus according to the first embodiment.

FIG. 1 is a plan view showing the appearance of input apparatus 100 according to the present embodiment. The input apparatus 100 has a plurality of input keys 10; in FIG. 1, it has a total of twelve input keys 10 (10a, 10b, 10c, ..., 10l) in an array of four horizontal rows and three vertical columns like dial buttons of ordinary cell phones. Supposing the input apparatus 100 is an input apparatus of a cell phone, the input keys 10 should originally be assigned indications of "1", "2", "*", "0", "#", etc., but FIG. 1 is depicted without illustrations of these numbers and marks, for easier understanding of the present invention.

In the input apparatus 100, each input key 10 is assigned a plurality of symbols (symbol group) In the description below, the hiragana writing symbols being one of the Japanese symbol formats will be described as an example of symbols to be inputted by each input key 10.

The Japanese hiragana writing symbols can be classified into a plurality of subgroups, and each subgroup consists of five symbols. These subgroups include the "あ line" group consisting of five symbols (あ, い, う, え, お) corresponding to five basic vowels, the "か line" group consisting of five symbols (か, き, く, け, こ) corresponding to the foregoing five vowels coupled with a specific consonant "K", the "さ line" group consisting of five symbols (さ, し, す, せ, そ) corresponding to the foregoing five vowels coupled with a specific consonant "S", the "た line" group consisting, of five symbols (た, ち, つ, て, と) corresponding to the foregoing five vowels coupled with a specific consonant "T", and so on.

For example, the "あ line" group is assigned to the input key 10a, the "か line" group to the input key 10b, the "さ line" group to the input key 10c, and the "た line" group to the input key 10d. In the same manner as above, the other groups are assigned to the other input keys 10.

As shown in FIG. 1, the input keys 10 are provided with indications of the symbol groups assigned to the respective input keys 10a, 10b, ..., 10l on their key top surface. For example, the "あ line" symbol group is displayed on the key top surface of the input key 10a. In the case of the input key 10a, specifically, under the definitions of upward HI, downward LO, rightward RI, and leftward LE, as shown in FIG. 1, the symbol "あ" is displayed at the upward HI position, and the symbol "う" at the downward LO position. Furthermore, "い" is displayed at the rightward RI position, "え" at the leftward LE position, and "お" at the center. Similar indications are also provided on each of the other input keys 10.

(Configuration of Input Key)

Figure 2:
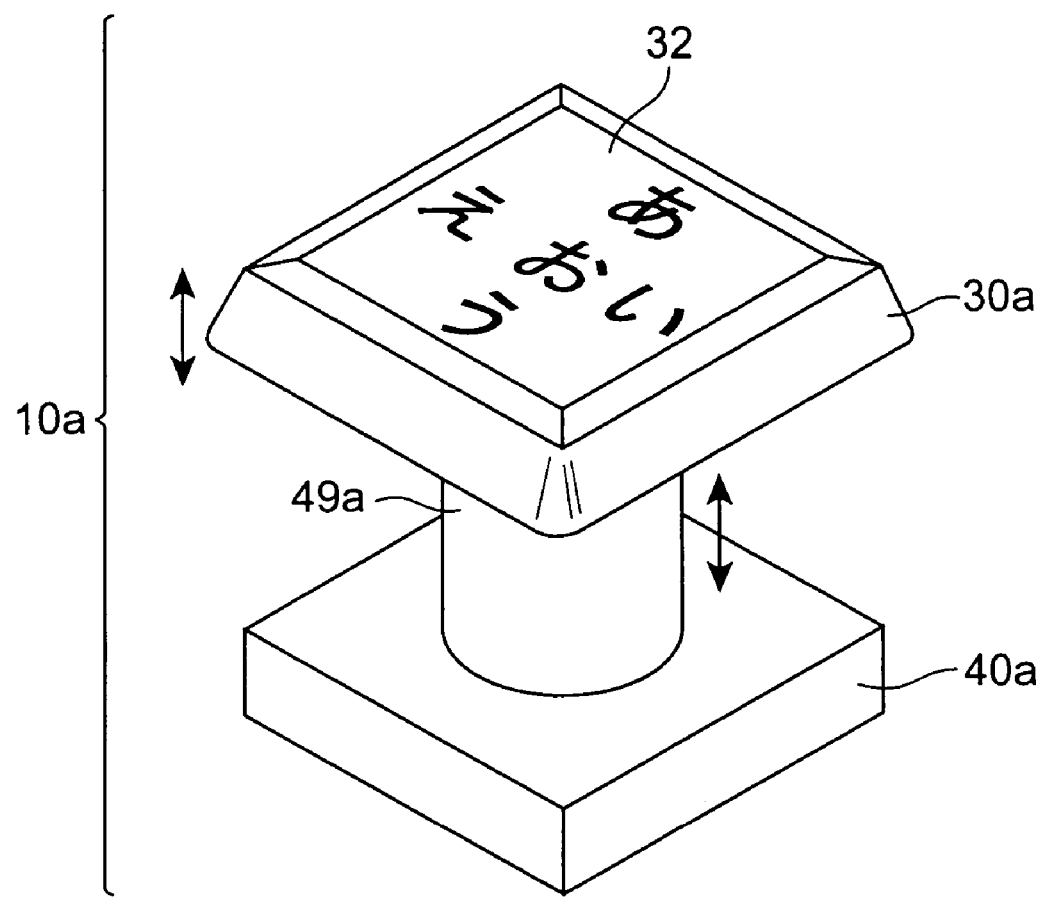
FIG. 2 is a perspective view showing a configuration of an input key provided in the input apparatus shown in FIG. 1.

FIG. 2 is a perspective view showing a configuration of the input key 10 a in the input apparatus 100.

The input key 10a has a key top 30a. A user of the input apparatus 100 touches this key top 30a by a finger to push the input key 10a.

Figure 3:
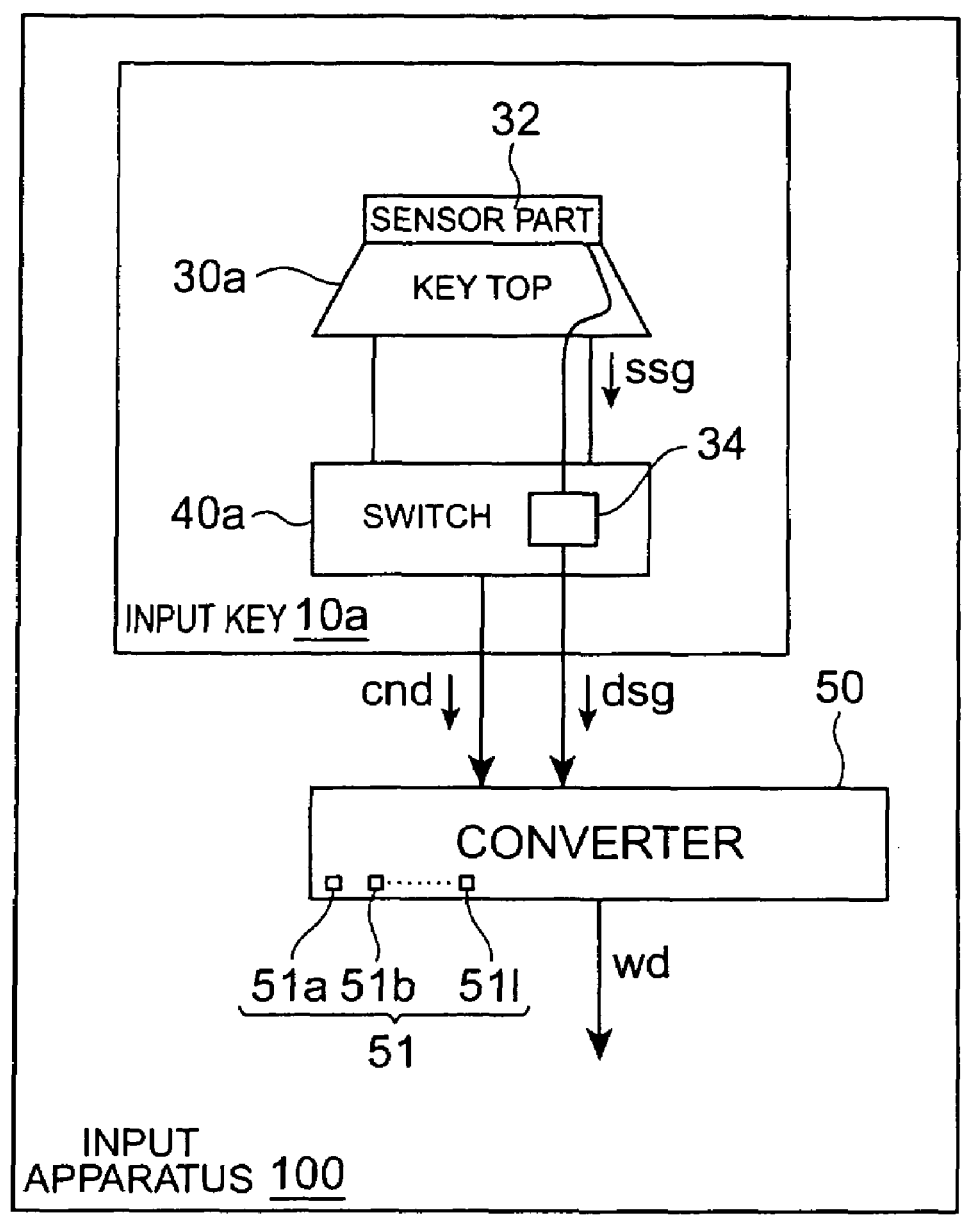
FIG. 3 is a functional block diagram of the input apparatus according to the first embodiment.

A sensor part 32 for detecting a position of an object touching the key top in an input operation, such as a finger, a tip of a pen, or the like to push the key top (hereinafter referred to as a "pusher") is provided in the surface of the key top 30a. The sensor part 32 is a position detecting means for detecting a push position of the pusher and, as shown in FIG. 3, an output signal thereof is fed to a moving direction detector 34 described below.

The moving direction detector 34 is configured so as to determine a temporal change of the push position of the pusher detected by the sensor part 32 to gain a sliding direction of the pusher on the key top 30a (a moving direction of the pusher).

The present embodiment is characterized in that a moving direction of the pusher can designate one symbol out of a symbol group assigned to each input key 10. This makes it feasible to designate a symbol to be inputted, by a smaller number of operations and to implement quick symbol input.

The key top 30a is mechanically coupled to a switch 40a by a connection pillar 49a. Therefore, the input key is configured so that when the user pushes the key top 30a of the input key 10a, the key top 30a moves toward the switch 40a and the change of the relative position of the key top 30a to the switch 40a changes the switch 40a from one state to another. States of the switch 40a include two states, on and off, and the switch 40a is configured so as to go into the on state with push of the input key 10a, for example, by contact with a finger, and so as to go into the off state when the finger is moved away from the input key 10.

The sensor part 32 is comprised of a sensor using the principle of the so-called pointing device, and a circuit for controlling the sensor.

For example, Japanese Patent Application Laid-Open No. Heisei 7-121290 discloses a coordinate input apparatus configured to measure a contact pressure of a finger by a change of electric resistance and calculate a contact position of the finger. The device of this type is called a touch pad (also referred to as a "pad type pointing device") and is recently commonly used as a compact pointing device in notebook computers and others. Since such a sensor can detect a sliding direction of a finger on the basis of the temporal change of the push position, the sliding direction of the finger on the key top 30a can be detected by applying similar technology.

(Functional Configuration of Input Apparatus)

FIG. 3 is a functional block diagram of the input apparatus 100 according to the first embodiment. As shown in FIG. 3, the input apparatus 100 has an input key 10a, and a converter 50 for converting a state of the switch 40a in the input key 10a and the moving direction detected by the moving direction detector 34, into symbol information and outputting an input symbol. The input key 10a is connected to the converter 50. Although the input apparatus 100 is provided with the input keys other than the input key 10a, FIG. 3 shows only the input key 10a without illustration of the other keys, for convenience' sake of illustration. These keys other than the input key 10a are also connected to the converter 50.

The converter 50 is connected to the twelve input keys 10a to 10l, and monitors states of the respective switches in these input keys 10a to 10l (the switch 40a in the case of the input key 10a). Namely, when the converter 50 determines from a state signal end outputted from the switch 40a that the switch has turned into the on state, it determines a symbol inputted by the user, based on a direction signal dsg (output signal from the moving direction detector 34), and outputs, the determined symbol wd. The converter 50 also monitors the conduction states of the other input keys 10b-10l. The operation of the converter 50 will be detailed later.

(Detection of Moving Direction)

Figure 4:
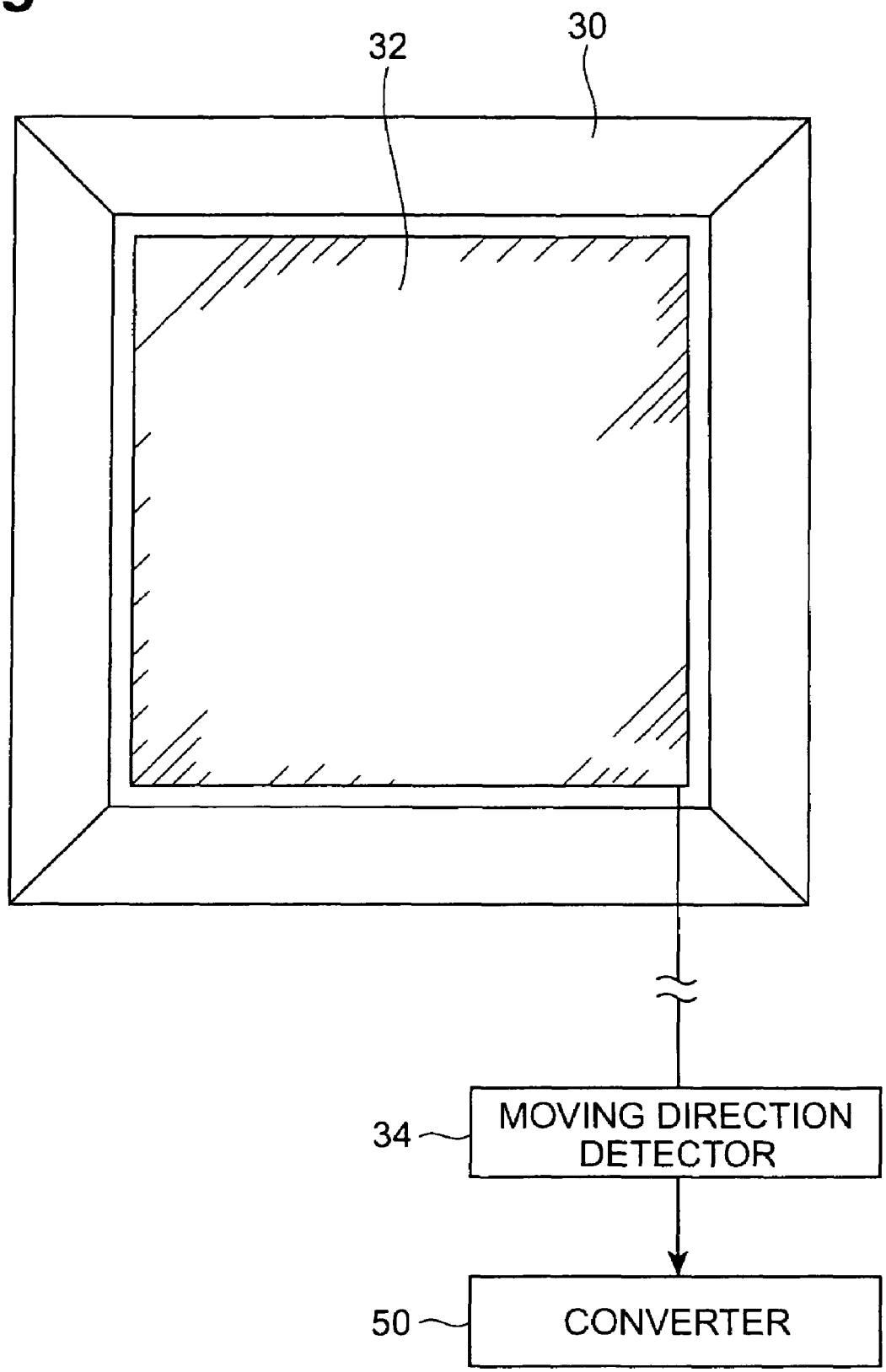

FIG. 4 is an explanatory diagram showing an appearance configuration of the key top 30a in the input key 10a. In the present embodiment, as described above, the sensor part 32 is constructed with a touch pad used as a pointing device in notebook computers and others. The input key 10a is comprised of a key top 30a, a sensor part 32 for sensing a push position of the pusher on the surface of the key top 30a, and a moving direction detector 34 for detecting a moving direction of the pusher on the surface of the key top 30a from a sensor signal ssg outputted from the sensor part 32, and the moving direction of the pusher moving on the key top 30a is detected by this configuration.

The input apparatus 100 according to the present embodiment is characterized in that the sensor part 32 in the input key 10a is provided on the surface of the key top 30.

The sensor part 32 detects a position of the pusher in contact therewith and feeds the detected position as a sensor signal ssg to the moving direction detector 34. The sensor part 32 of this configuration can be constructed, for example, by the technology similar to the device described in Japanese Patent Application Laid-Open No. Heisei 7-121910 (the device configured to determine X-Y coordinates by making use of change of resistance).

The moving direction detector 34 determines a moving direction of the pusher, based on a position change from the sensor signal ssg fed from the sensor part 32, and outputs a direction signal dsg. This direction signal dsg is a signal that can take one of five types of values of "up", "right", "left", "down", and "still". This direction signal dsg is fed into the converter 50.

It is also possible to set finer moving directions than these five directions. For example, a conceivable setting is nine moving directions of "still", "up", "upper right", "right", "lower right", "down", "lower left", "left", and "upper left". However, too fine settings will raise a risk of requiring user's operations with higher accuracy, and it is thus desirable to set the moving directions within a reasonable range that does not unduly affect human operations.

This moving direction detector 34 may be located anywhere. For example, it may be integrated with the sensor part 32 on the key top 30a. In this case, the moving direction detector is located on the key top 30a. The moving direction detector 34 may also be buried in the key top 30 or may be provided in the vicinity of the switch 40a at the base of the input key 10a. Furthermore, the moving direction detector 34 may be constructed separately from the input key 10a. For example, it may be provided in the vicinity of the converter 50 described later or on a substrate to which the input key 10a is attached. When it is constructed separately from the input key 10a, a preferred configuration is such that one moving direction detector 34 is provided as a common detector to the input keys 10a-10l.

When one moving direction detector 34 of this type is provided so as to be shared by the input keys 10a-10l, the number of components in the input apparatus 100 can be reduced.

By the configuration described above, the input key 10a is able to detect the moving direction of the pusher on the surface of the key top 30 with a push on the key top 30a by the pusher.

Incidentally, where, for example, a finger is used to push the key top 30a and is moved thereon, the finger is often moved on the key top 30a in a state in which the finger covers the entire area of the key top 30a. In such cases, the sensor part 32 is preferably configured so as to be able to detect the "barycentric position of the push" in the surface of the key top 30a. Namely, it is desirable to adopt a configuration to detect the "barycentric position of the push" as the push position of the finger on the surface of the key top 30a by the sensor part 32 shown in FIGS. 40, 41A, and 41B described later and to detect the direction of the push by the pusher, based on the detected barycentric position (or a change of the barycentric position).

Figure 40:
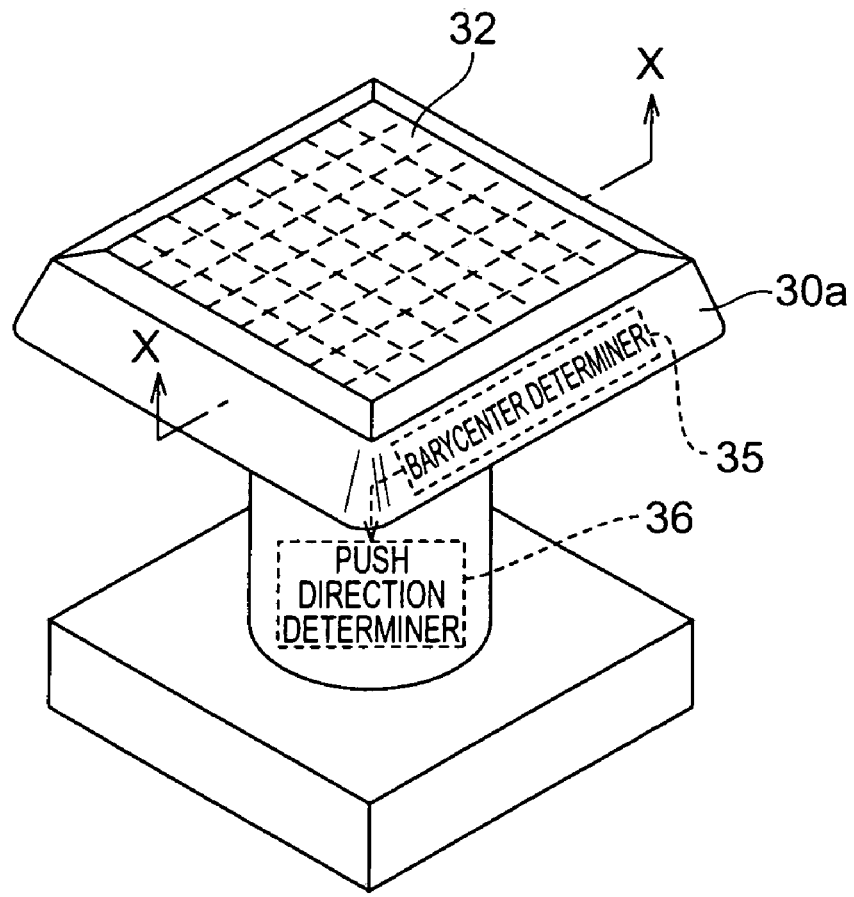
FIG. 40 is an illustration showing an example of a configuration for detecting a direction of a push on the basis of a barycentric position or a change of the barycentric position.
Figure 41A:
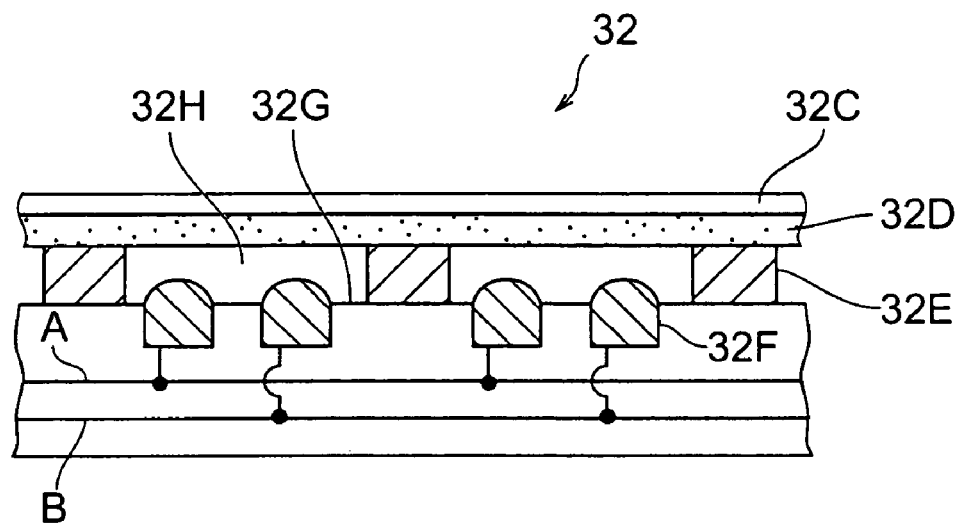
FIG. 41A is a sectional view along line X-X in FIG. 40 in a state in which a key is not pushed.

FIG. 40 shows an example of a configuration to detect a direction of a push by the pusher, based on the barycentric position (or change of the barycentric position), and FIG. 41A is a sectional view along line X-X in FIG. 40. In the sensor part 32 of the key top 30a shown in FIG. 40, as shown in FIG. 41A, there is provided a columnar part 32E (as indicated by dashed lines in FIG. 40) along the direction of the line X-X and along the direction perpendicular thereto on a substrate 32G, and a piezoelectric rubber sheet 32D of flat plate shape is provided on the columnar part 32E and over the entire surface of the sensor part 32. The surface of the piezoelectric rubber sheet 32D is protected by an elastic protection material 32C. Namely, spaces 32H are created between the piezoelectric rubber sheet 32D and the substrate 32G. On the substrate 32G, a plurality of electrodes 32F projecting on the substrate 32G are two-dimensionally placed at predetermined positions on the substrate 32G, and a predetermined clearance is created between the upper end of each electrode 32F and the piezoelectric rubber sheet 32D.

Figure 41B:
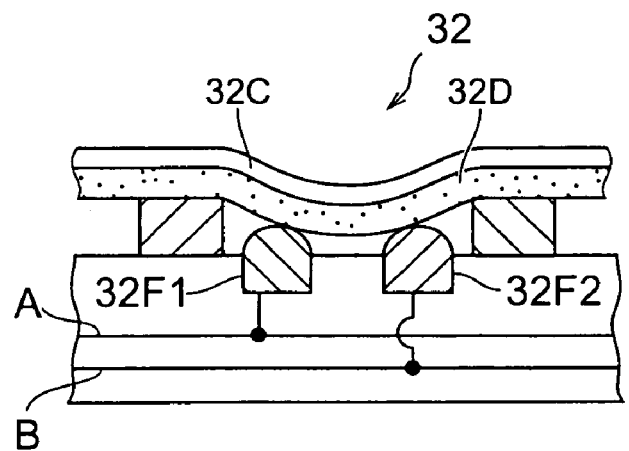
FIG. 41B is a sectional view along line X-X in FIG. 40 in a state in which the key is pushed.

As also shown in FIG. 41B, an electrode 32F1 is electrically connected to an electric wiring line A, and an electrode 32F2 adjacent to this electrode 32F1 is electrically connected to an electric wiring line B. A fixed potential difference is set between these electric wiring lines A, B by an unrepresented dc supply or the like, and an electric current flows when the electric wiring lines A and B are short-circuited. Direct-current resistances in electric connection of adjacent electrodes 32F1, 32F2 are arranged to differ depending upon locations of the electrodes 32F1, 32F2, and for this reason, electric current values in a short-circuit of the electric wiring lines A and B are different according to the locations of the electrodes 32F1, 32F2. The electric wiring lines A and B are connected each to barycenter determiner 35 and push direction determiner 36 shown in FIG. 40 (both of which will be described later).

For example, when the key top is pushed right above the electrodes 32F1, 32F2 in the sensor part 32, the protection material 32C and piezoelectric rubber sheet 32D yield in the vicinity of the barycentric position of the push as shown in FIG. 41B, whereby the piezoelectric rubber sheet 32D comes to contact the electrode 32F1 and the electrode 32F2. This results in electrically connecting the electrode 32F1 to the electrode 32F2 through the piezoelectric rubber sheet 32D so as to short-circuit the electric wiring lines A and B, whereupon an electric current flows. The configuration to short-circuit the electric wiring lines A, B with the push to achieve the flow of the electric current as described above corresponds to the "switch" described in the scope of claims.

The barycenter determiner 35 detects a value of the electric current flowing upon the short-circuit of the electric wiring lines A, B with the push, to detect the barycentric position of the push, and outputs the detected barycentric position information to the push direction determiner 36. In this way the barycenter determiner 35 corresponds to the "position detecting means" described in the scope of claims.

The push direction determiner 36 detects a "push" on the basis of the flow of the electric current and determines a direction of the push, based on the barycentric position information in a predetermined time from the push fed from the barycenter determiner 35.

The "barycentric position information in a predetermined time" herein embraces not only "change" of the barycentric position, but also information of the barycentric position, detected without change of the barycentric position (unchanged barycentric position itself). Namely, the push direction determiner 36 determines the direction of the push, based on the change of the barycentric position or based on the barycentric position itself. This "direction of the push" means a direction of a change where the barycentric position changes (a moving direction of the barycentric position), and where the barycentric position is unchanged, it means a relative position about the barycentric position on the sensor part 32. For example, where the barycentric position is unchanged near the upper end on the sensor part 32, the push direction determiner 36 determines "upward" as a direction of the push.

As described above, the detection of the push on the key top, and the detection of the input information according to the direction of the push can be substantialized not only by the operation to move the push position of the pusher (the barycentric position herein), but also by only the simple operation to push the key top while keeping the barycentric position still at a certain position on the key top surface for the predetermined time, whereby it becomes feasible to reduce the number of operations on the input key in input of information and to designate information to be inputted, by a simpler operation.

The above described the example in which the barycentric position (i.e., two-dimensional coordinates) was determined using the plurality of electrodes 32F two-dimensionally arranged at the predetermined positions on the substrate 32G, but the barycentric position (i.e., two-dimensional coordinates) may also be determined in such a manner that the mechanism of FIG. 41A is provided for each of two axes on the substrate 32G, a position along each axis about the barycentric position is determined, and the barycentric position is determined from the positions along the respective axes. The barycentric position detecting mechanism does not have to be limited to the configuration as shown in FIGS. 40, 41A, and 41B, but it is also possible to adopt a simple configuration in which a pad type pointing device capable of detecting the barycentric position on the surface is provided on the key top. In this case, based on an output from the pad type pointing device (a signal indicating the barycentric position), the push direction determiner 36 detects a "push" and determines a direction of the push, based on the barycentric position information in the predetermined time from the push.

(Conversion Operation)

Figure 5:
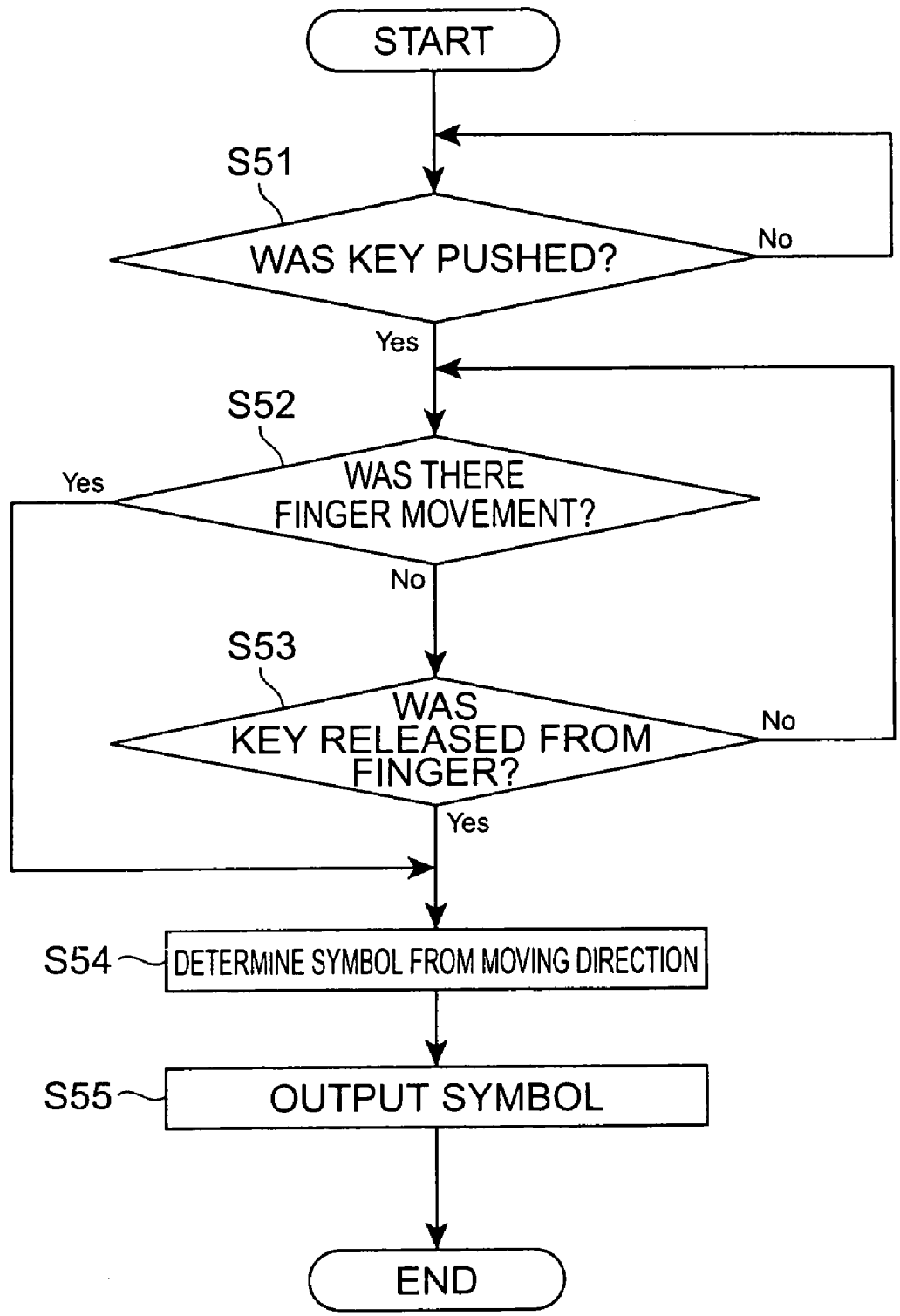
FIG. 5 is a flowchart showing an operation procedure of a converter.

FIG. 5 is a flowchart showing an operation procedure of the converter 50. The converter 50 is constructed separately from the input keys 10. The converter 50 is preferably provided on a substrate (not shown) to which the input keys 10 are attached, but it may also be provided on a separate substrate. The converter 50 determines a symbol to be inputted by the user, based on the state of the switch 40 and the direction signal dsg, converts it into symbol information, and outputs the pertinent symbol wd. In FIG. 5, a step is abbreviated to S.

With a start of the conversion operation, the converter 50 first awaits a push on the input key 10 at step 51. Namely, the converter 50 monitors the state of the switch 40 and, with the switch 40 turning into the conducting state, the converter determines that the user pushed one of the input keys 10, and goes to step 52. Without a push on any input key 10, step 51 continues.

When moving to step 52, the converter 50 checks the presence/absence of movement of the pusher on the surface of the key top 30. Namely, the converter 50 determines whether the value of the direction signal dsg from the moving direction detector 34 indicates "still" or any one of the other "up", "right", "down", and "left". When the direction signal dsg indicates "still", the converter determines that there is no movement of the pusher, and goes to step 53. When the direction signal dsg indicates "up", "right", "down", or "left", the converter determines that there was movement of the pusher, and goes to step 54.

When going to step 53, the converter 50 determines whether the switch 40 turned into the non-conducting state, to determine whether the pusher moved away from the input key 10. When the switch 40 is in the non-conducting state, the converter determines that the pusher is off the input key 10, and then goes to step 54. On the other hand, when the switch 40 is in the conducting state, the converter determines that the pusher is in contact with the input key 10, and then returns to step 52. In these steps 52 and 53, the user can designate a symbol to be inputted, by the following operation 1 or 2.

(Operation 1) To slide a finger toward a symbol to be inputted, at the same time as a push of the input key 10.
(Operation 2) To push the input key 10 and thereafter slide a finger toward a symbol to be inputted.

For designating a symbol by a slide of a finger, either of the above operations is executed, whereby the determination at step 52 becomes "YES", and a value other than "still" is supplied by the direction signal dsg to the converter 50. In consequence of this, the user can input a desired symbol (other than the center) (which will be described later). On the other hand, for inputting a symbol assigned to the center, the user pushes the input key 10 and thereafter directly releases the input key 10 without a slide of the finger. This results in making the determination of "YES" at step 53 and supplying the value of "still" by the direction signal dsg to the converter 50.

Then the converter 50 goes to step 54 to receive the direction signal dsg from the moving direction detector 34 and to determine a symbol to be inputted by the user, based on the value of the direction signal dsg and the pushed input key. In order to determine this symbol, the converter 50 selects a conversion table 51, based on the pushed key.

FIG. 6 is an explanatory diagram showing a conversion table 51 (conversion table 51a corresponding to the input key 10a) used by the converter 50. This conversion, table 51 is a table in which moving directions and symbols are stored in correlation with each other, and such conversion tables are provided for the respective input keys 10 a-10l. When the input key 10a is pushed, the switch 40a turns into the conducting state. When the converter 50 detects this conducting state, it selects the conversion table 51a corresponding to the input key 10a.

Then the converter 50 searches the selected conversion table 51 for data matching the input direction signal dsg. For example, when the direction signal dsg is "still", the converter 50 finds a row of "still" out of the conversion table 51a, and extracts the symbol "お" stored in correlation with the row. When the direction signal dsg is "down", the symbol "う" is extracted through a similar operation.

In a preferred configuration a storage means utilizing a semiconductor storage device is provided inside the converter 50 and the conversion tables 51 are stored in this storage means. In general the converter 50 is preferably constructed of a processor and a program executed by this processor. In this case, the program is preferably stored in a predetermined storage means. This storage means is preferably configured to also store the conversion tables 51, in terms of simplification of structure.

Typically, the converter 50 is preferably constructed using a small-scale computer so called a microcomputer. This microcomputer is a small-scale computer provided with a processor (CPU: Central Processing Unit), a ROM (Read Only Memory), a RAM (Random Access Memory), an I/O interface to the outside, and others. Preferably, the aforementioned program is stored in the ROM, and the conversion tables 51 in the RAM. The processor receives signals from the outside through the I/O interface.

When going to step 55 subsequent to step 54, the converter 50 outputs the symbol wd acquired at step 54.

As described above, the user can determine a symbol to be inputted, by sliding a finger on the surface of the key top 30 (making a slide) upon a push of the input key 10 (or after a push).

Therefore, since the user is required only to perform the operation to slide a finger on the key top 30 (make a slide) as an operation for determining a symbol, the symbol to be inputted can be determined by the extremely simple operation. A plurality of symbols can be inputted by one input key, and there is no need for performing a plurality of push operations for input of each symbol. Therefore, the symbol input can be smoothly and efficiently executed by the reduced number of push operations.

Incidentally, the above embodiment showed the input example of the Japanese hiragana writing symbols with FIG. 1, and in practice Japanese input requires input of several types of symbols including the katakana writing symbols, numerals, and alphabet, in addition to the hiragana writing symbols. In connection therewith, the following will describe an example of input of several types of symbols, using an extra key (hereinafter referred to as a "symbol type designation key") provided for designating a type of a symbol to be inputted.

Figure 32:
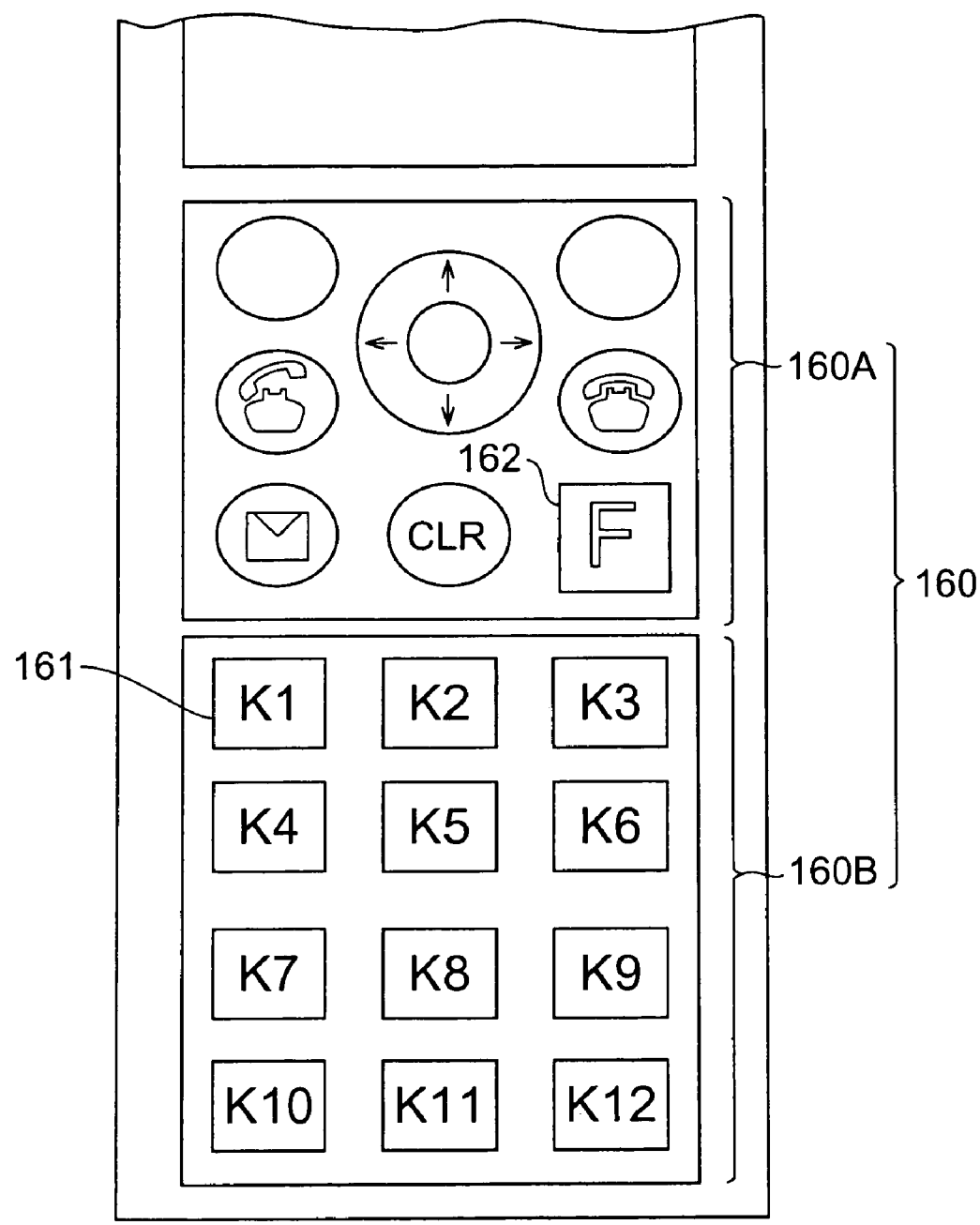
FIG. 32 is a configuration diagram of an input part of a cell phone in an example of implementing input of plural types of symbols.

For example, as shown in FIG. 32, an input portion 160 of a cell phone is composed of a special key arrangement part 160A and a symbol input key arrangement part 160B, wherein the symbol input key arrangement part 160B includes twelve (three horizontal x four vertical) keys 161 and wherein the special key arrangement part 160A includes a symbol type designation key (hereinafter abbreviated as an "F key") 162.

Figure 33:
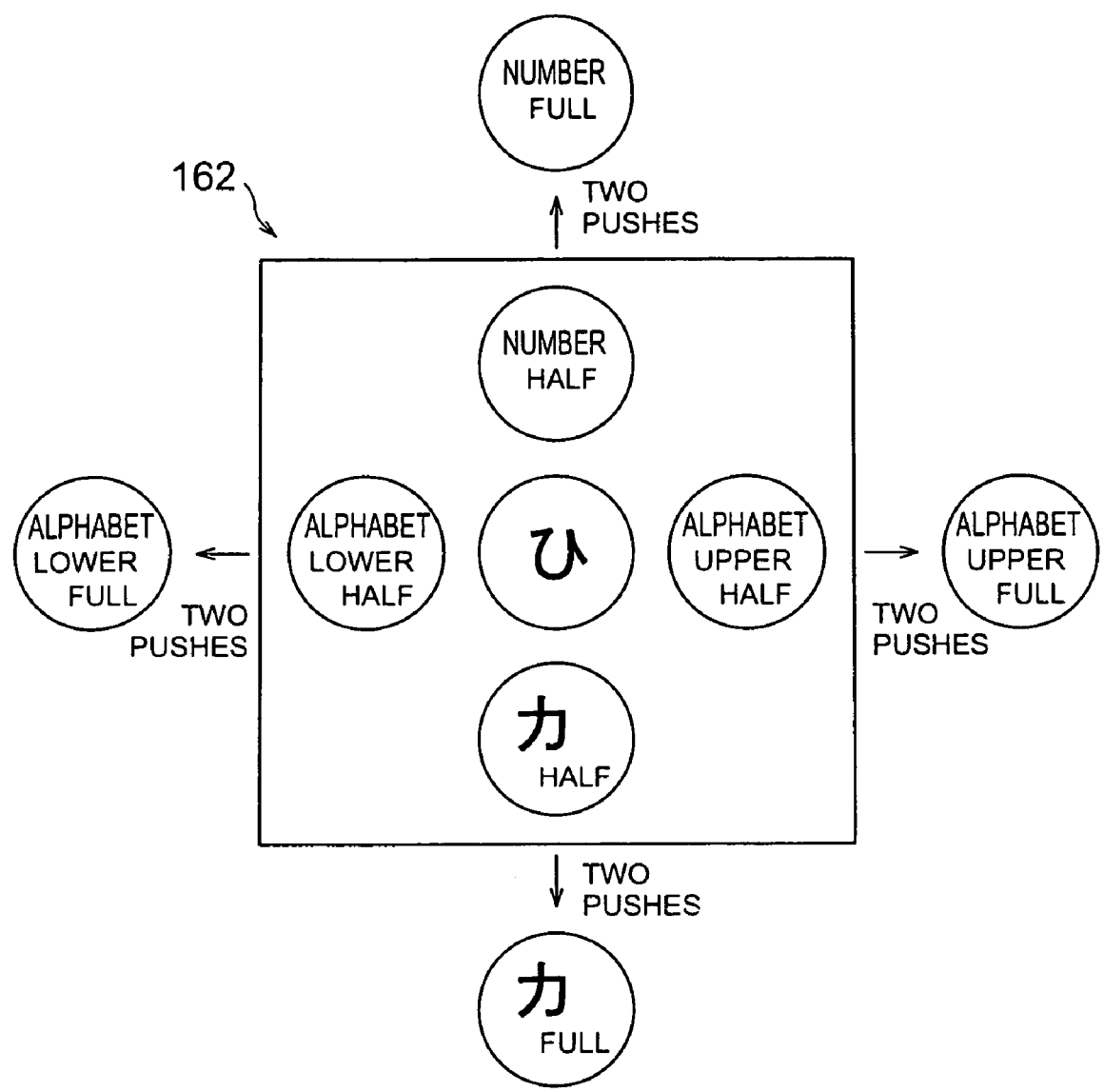
FIG. 33 is an illustration for explaining designation of symbol types assigned to an F key.

As shown in FIG. 33, the F key 162 is assigned symbol type designations for respective moving directions as follows. The F key 162 is so arranged that symbol types tending to be frequently inputted can be designated by one operation (a movement of a finger), for example, center (still)-hiragana writing symbols, upward-half-width (one byte) numbers, leftward-half-width English lower-case symbols, downward-half-width katakana writing symbols, and rightward-half-width English upper-case symbols. The F key 162 is so configured that the symbol types other than the above can be designated by two operations. Namely, as shown in the space outside the frame of the F key 162 in FIG. 33, the symbol type of full-width (two bytes) numbers can be designated by two continuous upward movements of a finger, and the symbol type of full-width English lower-case symbols by two continuous leftward movements of a finger. The symbol type of full-width katakana writing symbols can be designated by two continuous downward movements of a finger, and the symbol type of full-width English upper-case symbols by two continuous rightward movements of a finger. In this manner two continuous movements of a finger in a specific direction enable designation of a symbol type different from that designated by only one movement of a finger in that specific direction, thus providing expandability about designation of symbol types.

The symbol assignment to the twelve keys 161 in the symbol input key arrangement part 160B is, for example in the case of the hiragana writing symbols, that as shown in FIG. 34. Since the hiragana writing symbols can be classified under the symbol groups each consisting of five symbols like "five symbols in the あline group", "five symbols in the かline group" . . . , as described previously, one symbol group (five symbols) can be assigned to one key 161. As shown in the table format of FIG. 34, the key K1 is assigned the "five symbols (あ, い, う, え, お) in the あline group", and the key K2 the "five symbols (か, き, く, け, こ) in the かline group". In this manner, one symbol group (five symbols) can be assigned to one key 161.

As shown in the assignment to the keys K10, K11 in the table of FIG. 34, frequently input marks (cho-on (long sound), kuten (Japanese period), touten (Japanese comma), etc.) other than the hiragana writing symbols can also be assigned.

Furthermore, the special symbols among the hiragana writing symbols include an example of display of symbols in size smaller than usual (e.g., "ゃ", "っ", etc.), an example of display of voiced consonants (e.g., "が", "ざ", etc.), and an example of display of p-sounds (e.g., "ぱ", "ぴ", etc.). In addition, the hiragana writing symbols are often converted into katakana small symbols or katakana large symbols. Therefore, as shown in the assignment to the key K12 in the table of FIG. 34, it is also possible to assign the above-described functions of "conversion to small symbol", "conversion to voiced consonant", "conversion to p-sound", "conversion to katakana small symbol", and "conversion to katakana large symbol".

The above described the key assignment about the input of the Japanese hiragana writing symbols, but the present invention, which facilitates the input operation by assigning a plurality of symbols, marks, or functions to one key as shown in FIG. 34 and decreasing the number of key input operations, can also be applied to input of symbols in the other languages. Examples of application of the present invention to input of English, German, French, Chinese, and Korean symbols will be described below.

Figure 36:
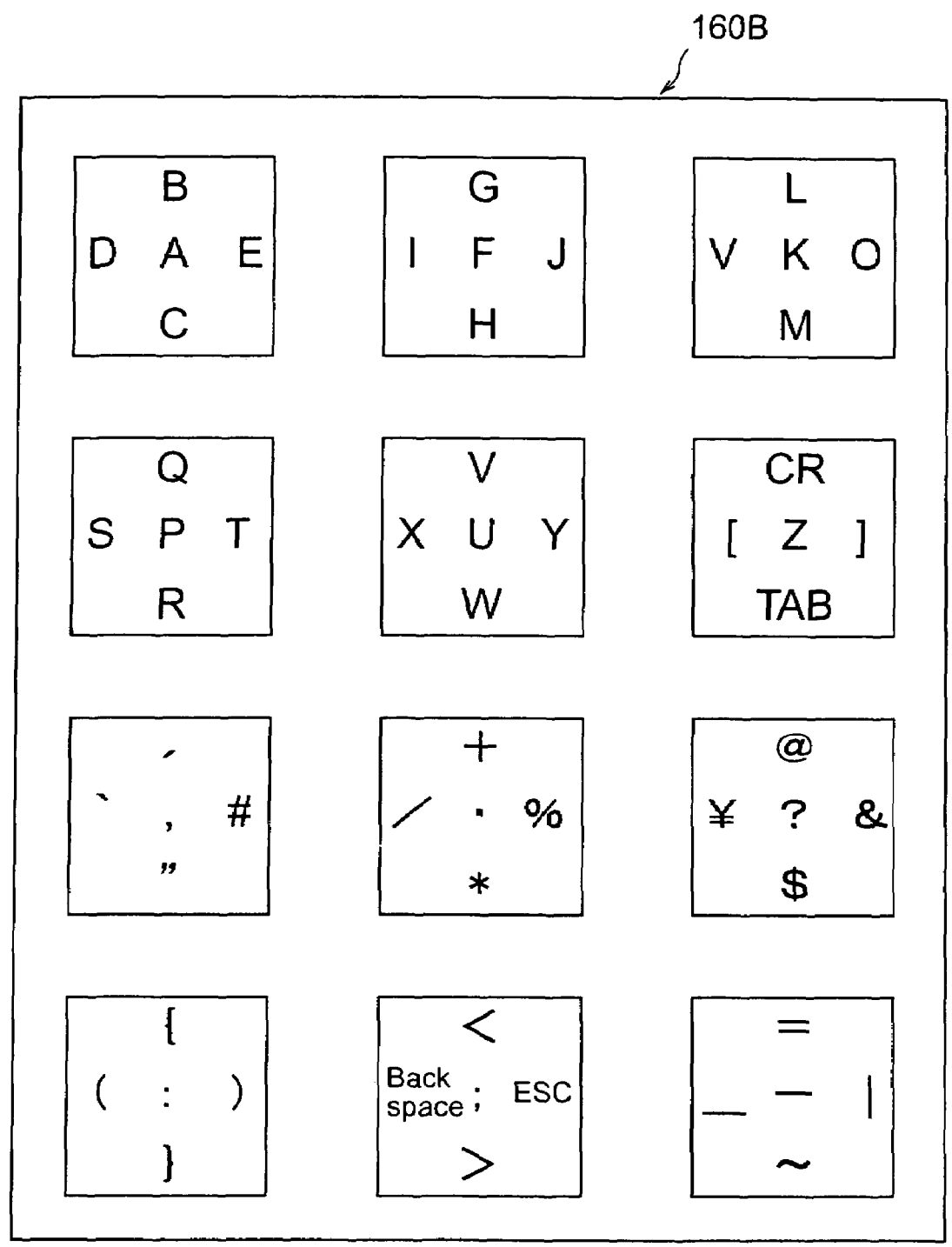
FIG. 36 is an illustration showing a state in which alphabet letters and marks are assigned to each of keys on the basis of the assignment table of FIG. 35.

First, an example of application of the present invention to input of English symbols will be described. The English symbols (alphabet) include twenty six symbols in total, and are not grouped into symbol groups each consisting of five symbols, different from the Japanese hiragana writing symbols. Thus a conceivable method is to assign five symbols to each key in order from the top of the alphabet (A, B, C, . . . ), as shown in FIG. 35. In that case, the keys K1-K6 are enough to assign all the twenty six symbols, and many keys are still left. Therefore, many marks (e.g., return (CR), tab (TAB), . . . ) can be assigned to the remaining keys. The assignment table of FIG. 35 shows the assignment of the alphabet and marks to the keys (K1-K12), and FIG. 36 shows an example of actual assignment to each of the keys (K1-K12) in the symbol input key arrangement part 160B (cf. FIG. 32), based on the assignment table.

This enables one to input the symbol types equivalent to those through the full keyboard by one operation (a movement of a finger). Namely, the function equivalent to that of the full keyboard can be substantialized by the smaller number of input keys, and the input of symbols can be implemented by the reduced number of input operations, thus dramatically improving the efficiency of input operation.

A switchover among four symbol types of half-width English lower-case symbols, full-width English lower-case symbols, half-width English upper-case symbols, and full-width English upper-case symbols can be implemented by manipulating the F key 162 in FIG. 32. FIG. 33 shows the F key 162 in Japanese, and, since the English does not include the hiragana and katakana writing symbols, all the four symbol types can be assigned to the four directions of the F key 162 in FIG. 32, whereby one can designate a desired English symbol type by one operation on the F key 162.

The assignment of the alphabet and marks to each of the keys (K1-K12) in FIG. 35 can also be applied to input of English symbols in Japanese.

Next, an example of application of the present invention to input of the German symbols will be described. For input of the German symbols, it is necessary to input peculiar symbols such as symbols with the Umlaut mark (e.g., Ä, Ö, Ü, etc.) and β (Eszett), in addition to the input of the same alphabet as in English.

Thus the peculiar symbols as described above can replace the mark-assigned portions in the assignment table of FIG. 35, whereby the input of the symbol types equivalent to those through the full keyboard can be implemented by one operation (a movement of a finger). Namely, the function equivalent to that of the full keyboard can be substantialized by the smaller number of input keys, and the input of symbols can be implemented by the reduced number of input operations, thus dramatically improving the efficiency of input operation.

Next, an example of application of the present invention to input of the French symbols will be described. In order to input the French symbols, it is necessary to input the peculiar symbols as described below, in addition to the input of the same alphabet as in English. Namely, the peculiar symbols are é (accent aigu), à, è, ù (accent grave), â, î, û, ê, ô (accent circonflexe), ï, ü, ë (tréma), ç (cédille), æ (o e composé), and so on.

Thus the peculiar symbols as described above can replace the mark-assigned portions in the assignment table of FIG. 35, whereby the input of the symbol types equivalent to those through the full keyboard can be implemented by one operation (a movement of a finger), as in the case of the English input. Namely, the function equivalent to that of the full keyboard can be substantialized by the smaller number of input keys, and the symbol input can be implemented by the reduced number of input operations, thus dramatically improving the efficiency of input operation.

Next, an example of application of the present invention to input of the Chinese symbols will be described. A common Chinese symbol input method is the pin-yin input system of inputting an alphabet sequence (pin-yin) equivalent to the reading (pronunciation) of a symbol as an input object. This pin-yin input system is classified under two input methods of complete pin input and bi-pin input.

The complete pin input uses the English keyboard as it is, and pin-yin is inputted in each symbol unit according to the alphabetical notation on the keyboard. For example, where Chinese "今天晴" corresponding to "今日は晴れです (sunny today)" is inputted, an alphabet sequence "JIN" corresponding to the reading (pronunciation) of "今", an alphabet sequence "TIAN" corresponding to the reading (pronunciation) of "天", and an alphabet sequence "QING" corresponding to the reading (pronunciation) of "晴" are inputted in order according to the alphabet notation on the English keyboard. Therefore, the key assignment as shown in FIG. 35 and FIG. 36 can be adopted for the complete pin input, as in the case of the aforementioned example of application of the present invention to the English symbol input, and it becomes feasible to input the symbol types equivalent to those through the full keyboard by one operation (a movement of a finger), thus dramatically improving the efficiency of symbol input operation.

On the other hand, the bi-pin input is a way of inputting each symbol by separate use of Chinese 声母(head consonant) and 韻母(subsequent vowel component). Here the 声母means a consonant at the head of a syllable, and "韻母" means a portion except for the head consonant in the syllable, the "韻母" always containing a vowel. In the bi-pin input, symbols are inputted by switching in an order of 声母(consonant)→韻母 (vowel component)→声母 (consonant)→韻母 (vowel component). Namely, this input method involves a device of reducing the number of typing operations on the keyboard by the separate use of声母 and 韻母, and, once one learns the keyboard arrangement of the bi-pin input, he or she can input symbols by the smaller number of input operations than by the aforementioned complete pin input, so as to realize efficient symbol input.

The bi-pin input of this type requires two key assignments, 声母(head consonant) key assignment for input of 声母and 韻母(subsequent vowel component) key assignment for input of 韻母. The present invention can be applied to these 声母key assignment and 韻母key assignment. For example, FIG. 37A shows an example of the 声母key assignment. The key K1 is assigned five 声母(consonants) (b, c, ch, f, g), and which consonant was inputted can be determined by a moving direction of a finger on the key K1. The keys K2-K5 can also be assigned consonants in similar fashion. FIG. 37B shows an example of the 韻母key assignment. The key K1 is assigned five 韻母(vowel components) (a, ai, an, ang, ao), and which vowel component was inputted can be determined by a moving direction of a finger on the key K1. The keys K2-K7 can also be assigned vowel components in similar fashion.

In the bi-pin input, symbols are inputted by switching in the order of consonant→vowel component→consonant→vowel component as described above, and the key assignment is arranged to become the consonant key assignment of FIG. 37A upon input of a consonant and to become the vowel component key assignment of FIG. 37B upon input of a vowel component.

In the bi-pin input, as described above, the consonant and vowel component key assignments as shown in FIGS. 37A and 37B enable one to input the symbol types equivalent to those through the full keyboard by one operation (a movement of a finger). Namely, the function equivalent to that of the full keyboard can be substantialized by the smaller number of input keys, and the symbol input can be implemented by the reduced number of input operations, thereby dramatically improving the efficiency of input operation.

In the Chinese input, the marks (e.g., !, ?, etc.) other than the symbols are also often inputted. It is thus desirable to assign the various types of marks to the remaining portions in the key assignments of FIGS. 37A and 37B, just as in the case of the assignment example of the English symbols in FIG. 35, thereby achieving efficient input as to input of marks as well.

Lastly, an example of application of the present invention to input of the Korean symbols will be described. Each Korean symbol (hangul symbol) is composed of a combination of a consonant with a vowel. Therefore, for symbol input, it is necessary to input a consonant-indicating part and a vowel-indicating part for each symbol. There are nineteen consonants and twenty one vowels, and forty portions indicating the total of these forty sounds are assigned to keys. An example of this assignment is presented in FIG. 38. In FIG. 38, portions surrounded by thick line 163 represent the nineteen portions indicating the consonants, and the other twenty one portions correspond to the portions indicating the vowels.

Since the keys can be assigned the forty portions indicating the respective sounds, the forty sounds in total including the nineteen consonants and twenty one vowels, as described above, it becomes feasible to input the symbol types equivalent to those through the full keyboard by one operation (a movement of a finger). Namely, the function equivalent to that of the full keyboard can be substantialized by the smaller number of input keys, and the symbol input can be implemented by the reduced number of input operations, thereby dramatically improving the efficiency of input operation.

In the Korean input, the marks (e.g., !, ?, etc.) other than the symbols are also often inputted. It is thus desirable to assign the various types of marks to the remaining keys (keys K9-K12) in the key assignment of FIG. 38, just as in the case of the assignment example of the English symbols in FIG. 35, thereby achieving efficient input as to the input of marks as well.

As described above, the present invention is applicable to input of symbols in various languages, and achieves the excellent effects of substantializing the function equivalent to that of the full keyboard by the smaller number of input keys and enabling the symbol input by the reduced number of input operations, thereby dramatically improving the efficiency of input operation.

Second Embodiment

In the first embodiment, the touch pad was used as the sensor part 32 used in detection of the moving direction. This sensor part 32 can be realized by use of the principle of an optical mouse. Here the optical mouse is a mouse provided with a light emitting means and a. light receiving means on the back side of the mouse. This configuration is able to detect a direction of movement of a contact surface with the mouse relative to the mouse and relatively detect a direction and an amount of movement of the mouse itself.

A moving direction of a finger can be detected by inverting the optical mouse upside down (or turning it over) from the usual use form and bringing a finger in touch with the light emitting means. The sensor part 32 in the present embodiment can be realized by applying the same configuration to the input keys.

Figure 39:
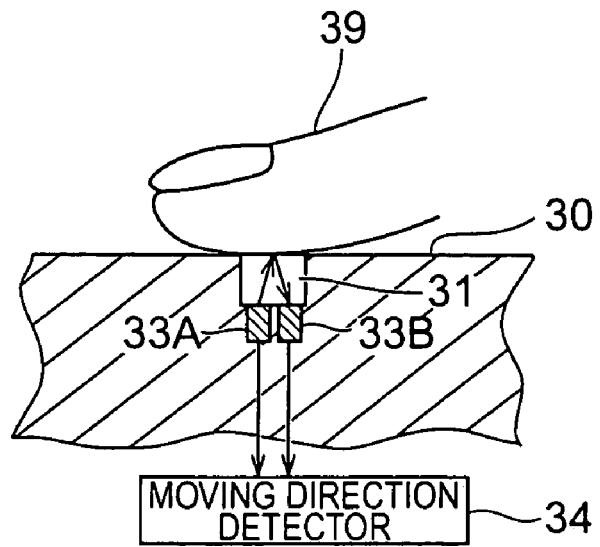
FIG. 39 is an illustration showing an example of a configuration for optically detecting movement of a finger.

The technology of optically detecting the finger movement in this manner is described, for example, in Japanese Patent Application Laid-Open No. 2002-91689. Japanese Patent Application Laid-Open No. 2000-508430 discloses the technology of optically measuring a translational motion relative to a measuring device. By applying the technologies described in these applications, the sensor part 32 in the present embodiment can be configured. For example, as shown in FIG. 39, a conceivable configuration is such that a hole 31 is bored in a surface of key top 30, and a light emitter 33A and a light receiver 33B are provided in the bottom of the hole 31. In this configuration, the light emitter 33A emits light toward a finger 39 moving on the surface of the key top 30 and the light receiver 33B receives reflected light from the finger 39. A moving direction detector 34 for controlling the light emitter 33A and the light receiver 33B is able to detect a moving direction of the finger 39 from the principle of the Doppler effect, based on a difference between a frequency of the light emitted from the light emitter 33A and a frequency of the light received by the light receiver 33B. FIG. 39 shows only a pair of light emitter 33A and light receiver 33B, but it is also possible to provide plural pairs of light emitters 33A and light receivers 33B with different directions of emission and reception of light.

The sensor part 32 used in the detection of the moving direction can also be implemented by use of below-described (1) a mechanism of a mechanical mouse, (2) a mechanism of detection using vibratory sound, or (3) a mechanism of detection utilizing static electricity generated by friction, besides the use of the mechanism of the optical mouse as described above. These mechanisms (1) to (3) will be outlined below.

Figure 24A:
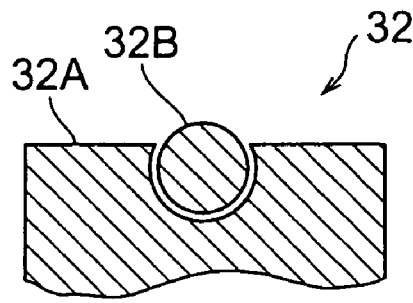
FIG. 24A is a vertical sectional view in a configuration example utilizing a mechanism of a mechanical mouse as a sensor part.
Figure 24B:
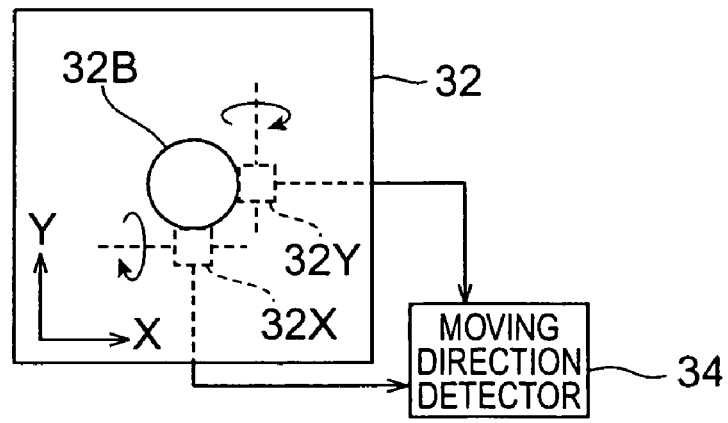
FIG. 24B is a plan view in the configuration example utilizing the mechanism of the mechanical mouse as a sensor part.

An example of (1) the mechanism of the mechanical mouse is presented in FIGS. 24A and 24B. FIG. 24B is a plan view of the sensor part 32 and FIG. 24A a sectional view along line b-b in FIG. 24B. As apparent from these figures, this configuration example is one in which a ball bearing 32B a little projecting from a surface 32A is arranged rotatable around the X-axis and around the Y-axis in FIG. 24B, in the central region of the sensor part 32. In this configuration, a rotational amount detector 32X detects an amount of rotation around the X-axis of the ball bearing 32B, and a rotational amount detector 32Y detects an amount of rotation around the Y-axis thereof, and the detectors output the detected rotational amounts to a moving direction detector 34, whereby the moving direction detector 34 can detect the moving direction of the finger on the surface 32A.

Figure 25:
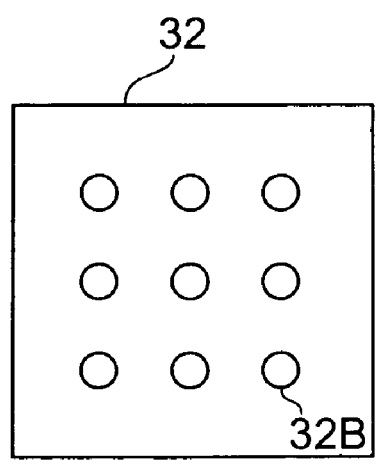
FIG. 25 is a plan view in a configuration example in which ball bearings are placed in a sensor part.

As shown in FIG. 25, a plurality of ball bearings 32B in the above configuration may be arranged in the sensor part 32, and in this case, the user can feel a push by a finger and the detection accuracy of the finger moving direction can be improved and stabilized.

(2) The mechanism of detection using vibratory sound can be one of several conceivable mechanisms. (2-1) A first mechanism is a configuration wherein indented projections are formed in the surface of the key top and intervals of the projections are changed depending upon directions. This configuration is one of determining the moving direction of the finger, based on the difference among natural frequencies of vibration or sound generated by friction between the finger and projections during the finger movement on the key top.

Figure 26A:
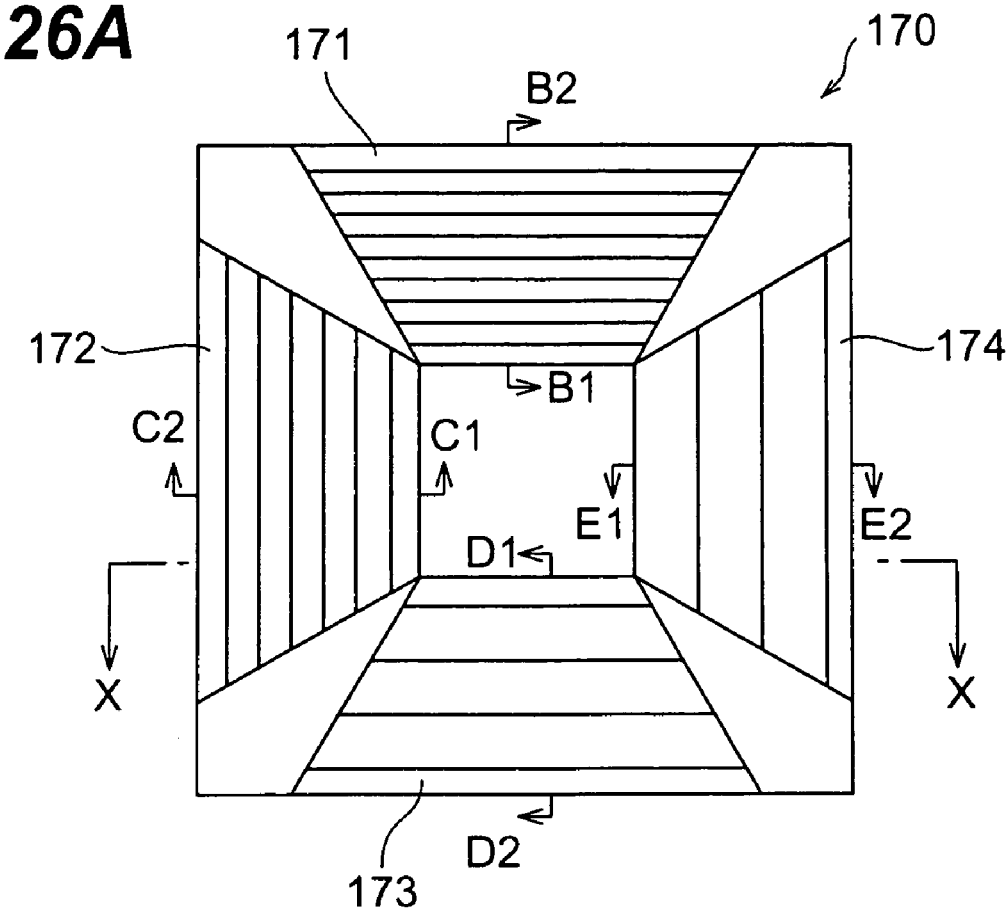
FIG. 26A is a plan view in a first example utilizing a mechanism of detecting vibratory sound, as a sensor part.
Figure 26B:
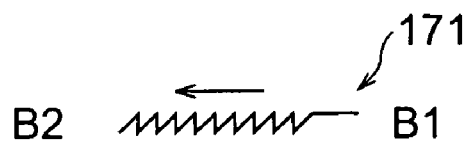
FIG. 26B is a sectional view along line B1-B2 in FIG. 26A.
Figure 26C:
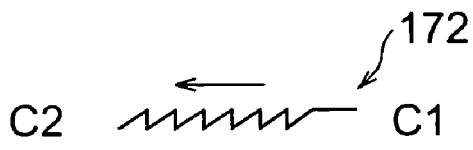
FIG. 26C is a sectional view along line C1-C2 in FIG. 26A.
Figure 26D:
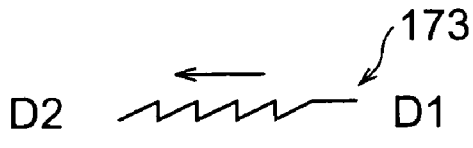
FIG. 26D is a sectional view along line D1-D2 in FIG. 26A.
Figure 26E:
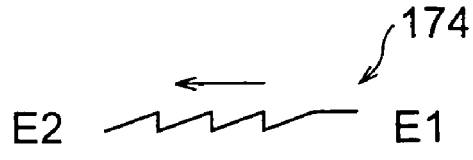
FIG. 26E is a sectional view along line E1-E2 in FIG. 26A.

For example, FIG. 26A shows an example of key top 170 with the aforementioned projections. A sectional view along line B1-B2 herein is presented in FIG. 26B, a sectional view along line C1-C2 in FIG. 26C, a sectional view along line D1-D2 in FIG. 26D, and a sectional view along line E1-E2 in FIG. 26E, wherein an arrow in each figure represents a direction of movement of a finger (a direction from the center to the periphery of the key top 170). As apparent from these FIGS. 26B to 26E, the intervals of the indented projections are arranged so that the intervals of the projections in an up region 171 are the narrowest and so that the intervals subsequently increase in an order of the intervals of the projections in a left region 172, the intervals of the projections in a down region 173, and the intervals of the projections in a right region 174. For this reason, the relation of f1>f2>f3>f4 holds among the natural frequency f1 of vibration or sound generated by friction between the finger and the projections in the up region 171, the natural frequency f2 of vibration or sound generated by friction between the finger and the projections in the left region 172, the natural frequency f3 of vibration or sound generated by friction between the finger and the projections in the down region 173, and the natural frequency f4 of vibration or sound generated by friction between the finger and the projections in the right region 174.

Figure 27:
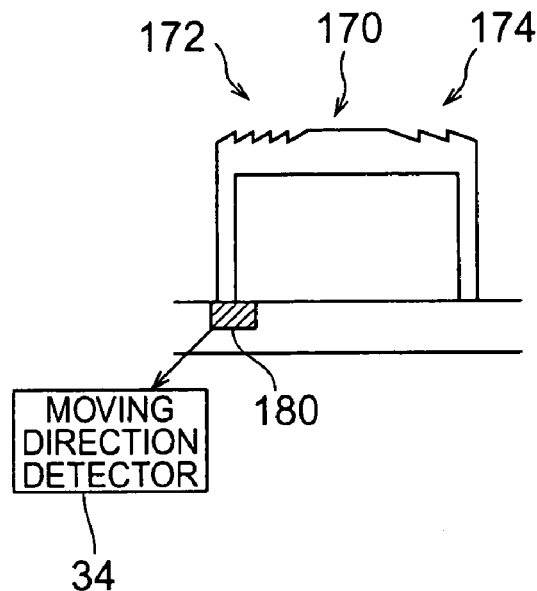
FIG. 27 is a sectional view along line X-X in FIG. 26A.

FIG. 27 shows a sectional view along line X-X in FIG. 26A, and, as shown in this FIG. 27, a frequency detecting device (e.g., microphone 180) is disposed below the key. An output from this microphone 180 is fed to the moving direction detector 34. The moving direction detector 34 is able to detect in which region the friction occurred between the finger and projections (i.e., in which direction the finger moved), based on detection of one of the above-described natural frequencies f1 to f4.

A next conceivable configuration is (2-2) one in which indented projections are formed in the surface of the key top and in which a generation location of vibration or sound generated by friction between the finger and projections is detected by a plurality of vibration detecting devices (microphones).

Figure 28:
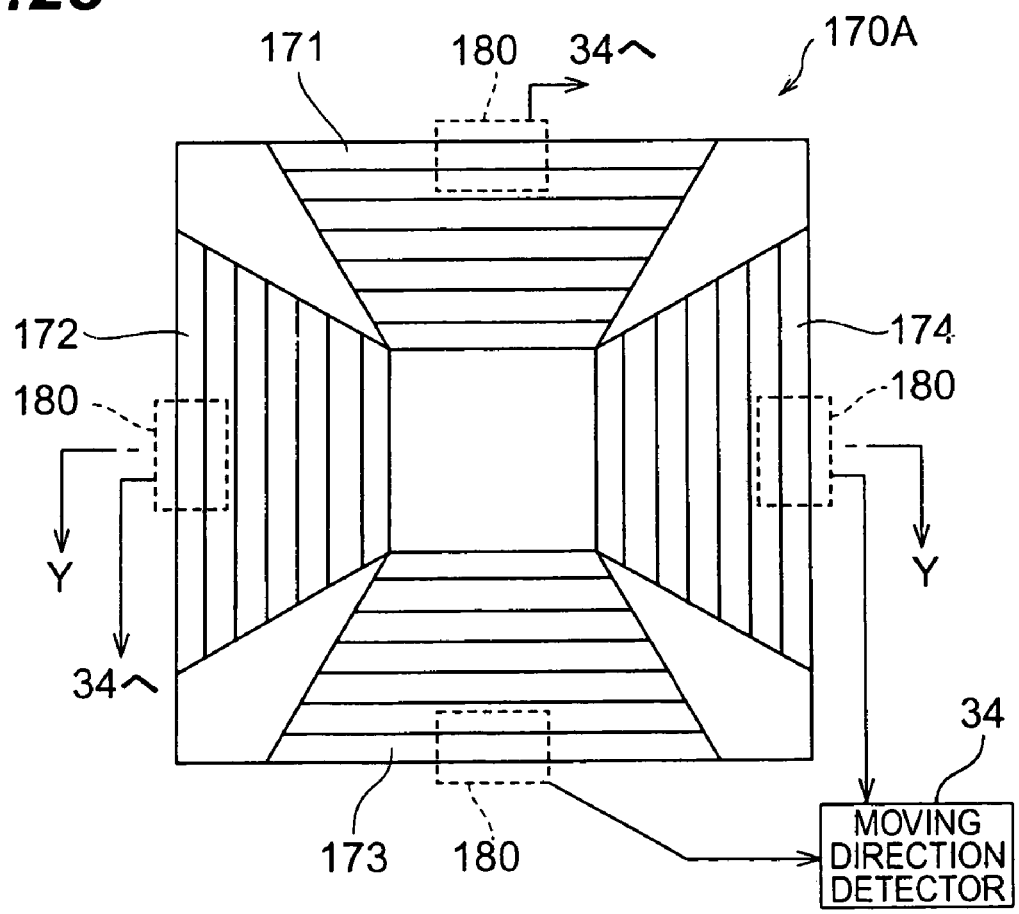
FIG. 28 is a plan view in a second example utilizing a mechanism of detecting vibratory sound, as a sensor part.
Figure 29:
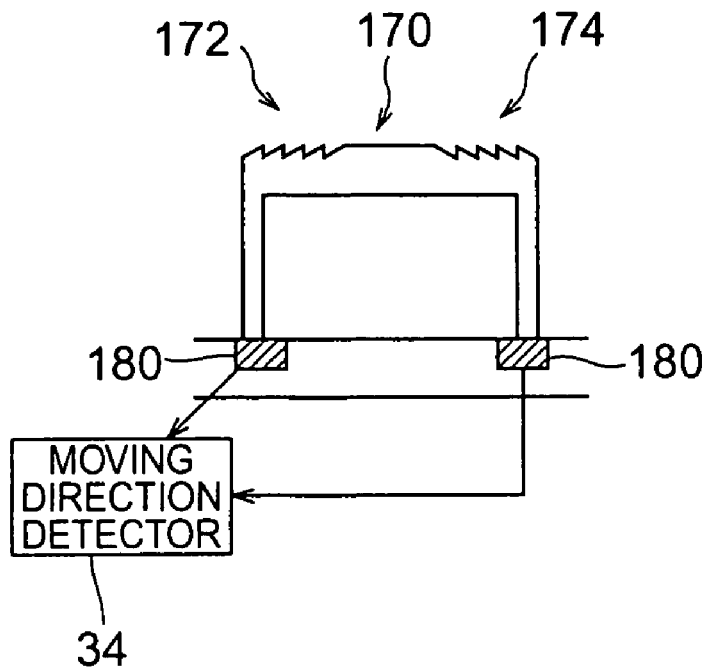
FIG. 29 is a sectional view along line Y-Y in FIG. 28.

For example, FIG. 28 shows an example of key top 170A in which the foregoing projections are formed, and FIG. 29 a sectional view along line Y-Y in FIG. 28. The projections shown in FIG. 28 are formed at an equal interval in the up region 171, in the left region 172, in the down region 173, and in the right region 174, and there is no need for changing the interval, depending upon the directions, different from aforementioned FIG. 26A. A plurality of (four herein) vibration detecting devices (e.g., microphones 180) indicated by dashed lines in FIG. 28 are provided below the key shown in FIG. 29, and outputs from the respective microphones 180 are fed to the moving direction detector 34. The moving direction detector 34 is able to detect in which region friction occurred between the finger and the projections (i.e., in which direction the finger moved), based on detection of the largest vibration or sound by which one of these four microphones 180.

The regions without formation of the projections in the key top shown in FIG. 28 are smoothed by a surface treatment so as to generate little vibration or sound upon friction with a finger.

A next conceivable configuration is (2-3) one in which indented projections are formed in the surface of the key top and in which vibrating rods with different natural frequencies depending upon places are provided in interior regions of the key top corresponding to the projection-formed regions. In this configuration, the vibrating rods in the interior regions of the key top are vibrated by vibration generated by friction between the finger and the projections in the key top surface during movement of the finger, on the key top, and the finger moving direction is determined based on the difference among the natural frequencies detected from the vibration of the vibrating rods.

Figure 30:
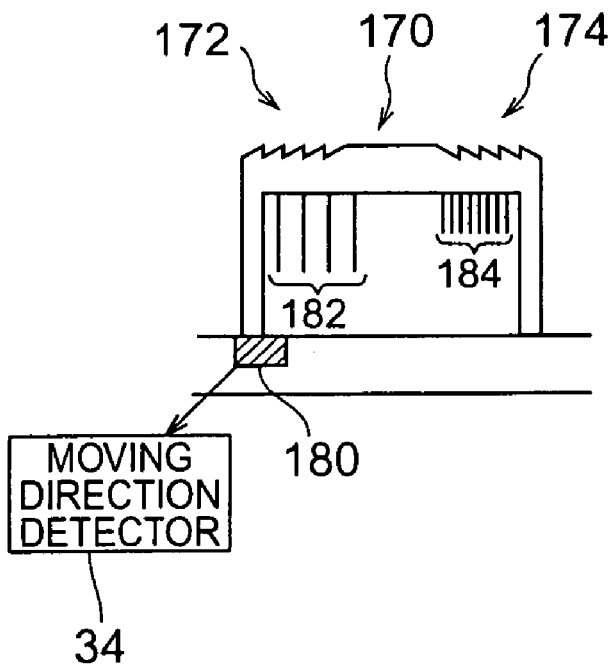
FIG. 30 is a vertical sectional view showing a third example utilizing a mechanism of detecting vibratory sound, as a sensor part.

The indented projections formed in the surface of the key top can be those with an equal projection interval, as in FIG. 28. However, the vibrating rods with different natural frequencies depending upon places are provided in the interior regions of the key top corresponding to the projection-formed regions. FIG. 30 shows a sectional view along line Y-Y in FIG. 28, and shows the vibrating rods 182 provided inside the left region 172 and the vibrating rods 184 provided inside the right region 174 in FIG. 28. The vibrating rods provided inside the up region 171, the left region 172, the down region 173, and the right region 174 in FIG. 28 in this manner have mutually different natural frequencies set by changing the setting interval and length or the like. For example, the relation of f1>f2>f3>f4 holds among the natural frequency f1 of the vibrating rods inside the up region 171, the natural frequency f2 of the vibrating rods inside the left region 172 (the vibrating rods 182 in FIG. 30), the natural frequency f3 of the vibrating rods inside the down region 173, and the natural frequency f4 of the vibrating rods inside the right region 174 (the vibrating rods 184 in FIG. 30).

A frequency detecting device (e.g., microphone 180) is provided below the key as shown in FIG. 30, and an output from the microphone 180 is fed to the moving direction detector 34. The moving direction detector 34 is able to detect in which region friction occurred between the finger and projections (i.e., in which direction the finger moved), based on which frequency is detected among the above natural frequencies f1 to f4.

The vibrating objects inside the key are not limited to those of rod shape (vibrating rods), but they may be of any other shape such as the plate shape (vibrating plates).

It is also possible to adopt a combinational configuration of two or more (2-1) to (2-3) among (2) the aforementioned mechanisms of detection using vibratory sound.

Next, (3) the mechanism of detection using static electricity generated by friction will be described. This mechanism is one in which unevenness is formed in the surface of the key top and in which the uneven part undergoing friction with the finger is made of one of the below-described materials likely to generate static electricity by friction. In this configuration, a region generating the largest amount of static electricity is specified to detect movement of the finger toward the region (finger moving direction).

Figure 31:
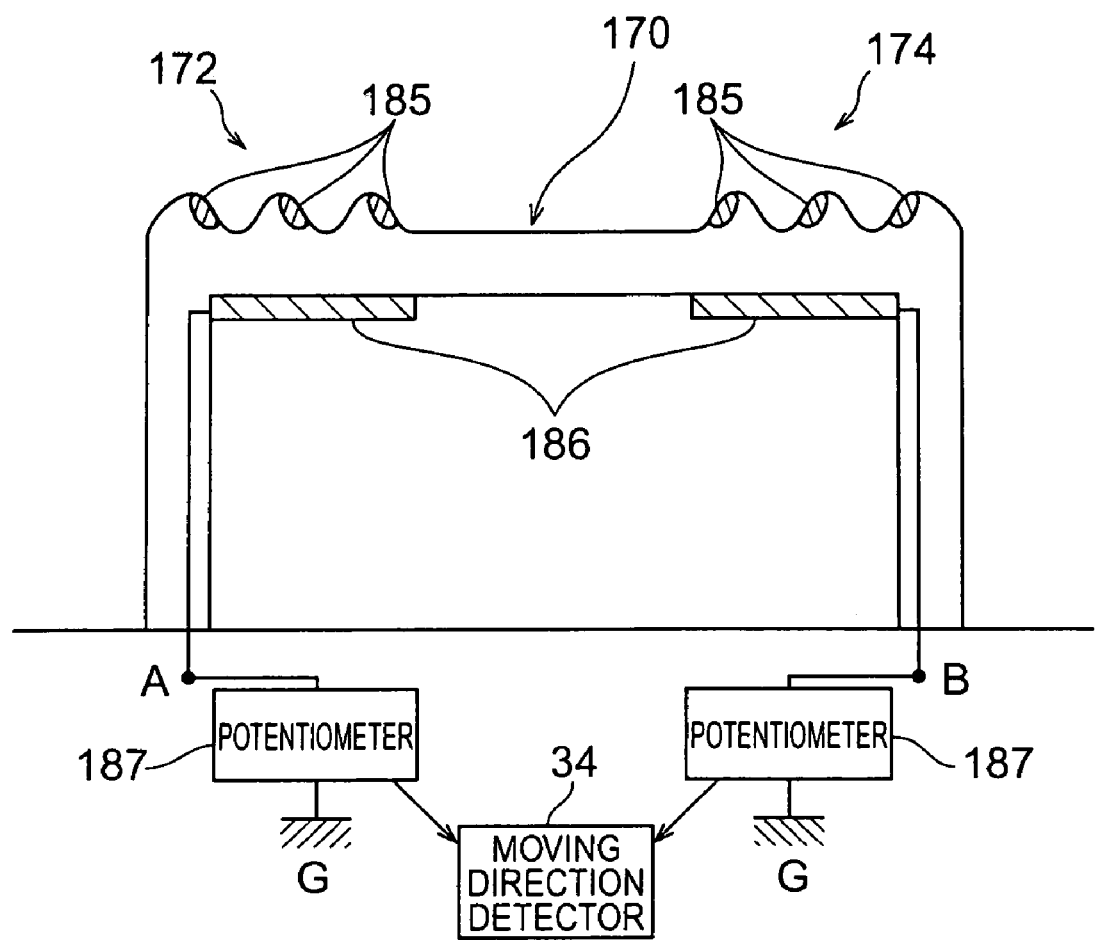
FIG. 31 is a vertical sectional view showing an example utilizing a mechanism of detecting an amount of static electricity generated, as a sensor part.

The foregoing unevenness can be provided in each of the aforementioned up region 171, left region 172, down region 173, and right region 174 in FIG. 28. FIG. 31 shows a sectional view along line Y-Y in FIG. 28. As shown in this FIG. 31, an inside region (i.e., an area on the center side of the key top) 185 of each uneven region is made of a material likely to generate static electricity by friction (e.g., polyvinyl chloride, polyethylene, celluloid, ebonite, or the like) and charge accumulators 186 are provided in interior regions of the key top corresponding to the respective unevenness-formed regions. Each charge accumulator 186 is electrically connected to an individual potentiometer 187 so that each potentiometer 187 can measure an amount of charge accumulated in the charge accumulator 186 (a charge amount of static electricity generated at the unevenness on the corresponding surface side). An output (the measured value of the charge amount of static electricity) from each potentiometer 187 is fed to the moving direction detector 34. The portions other than the inside regions 185 of the respective uneven regions in the key top are desirably made of a material unlikely to generate static electricity by friction (e.g., glass, nylon, aluminum, etc).

Thanks to this configuration, the moving direction detector 34 is able to detect in which region friction occurred between the finger and unevenness (i.e., in which direction the finger moved), based on where a maximum of the charge amounts accumulated in the charge accumulators 186 (the charge amounts of static electricity generated in the uneven regions on the corresponding surface side) appears corresponding to one of the up region 171, left region 172, down region 173, and right region 174 in FIG. 28.

Third Embodiment

In the first embodiment the converter 50 was provided with the conversion tables 51 for the respective input keys 10. The conversion tables 51 can be preliminarily set in production stages, but they may also be arranged to be freely set by the user. For implementing this setting, a conceivable configuration is such that an external setting device is connected to the converter 50 and the contents of the conversion tables 51 provided inside the converter 50 are rewritten by use of this setting device.

In this case, it would be convenient to allow the user to rewrite the contents of the conversion tables 51 through manipulation and input with the input keys 10. The present embodiment will describe an embodiment where the user rewrites the contents of the conversion tables 51, using the input keys 10 as described above.

Figure 7:
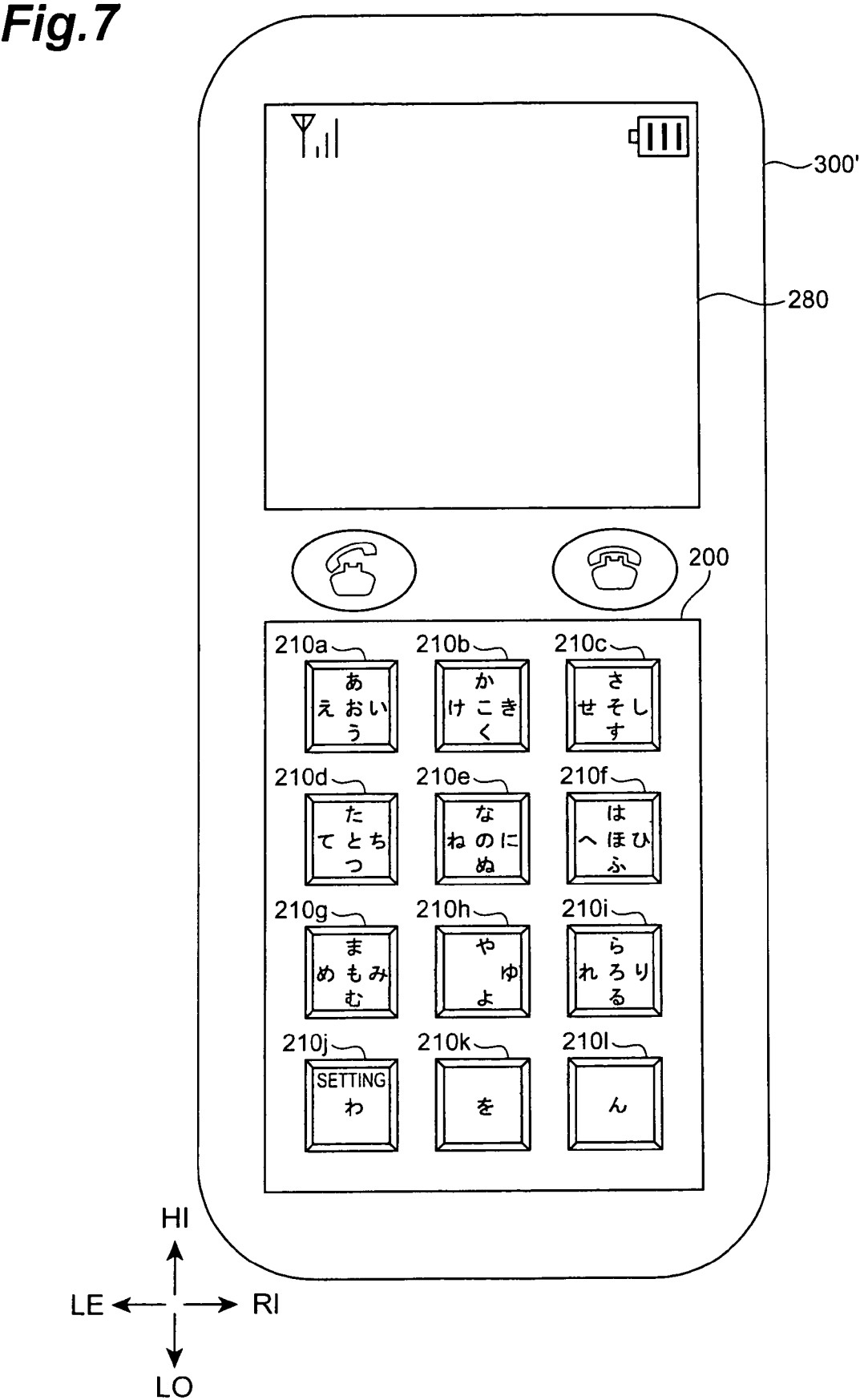
FIG. 7 is an illustration showing an appearance configuration of a cell phone provided with an input apparatus according to the third embodiment.

FIG. 7 is an illustration showing an appearance configuration of a cell phone 300 equipped with an input apparatus 200 according to the present embodiment. As shown in FIG. 7, the cell phone 300 is provided with an input apparatus 200 and a display screen 280, wherein the input apparatus 200 has the vertically long shape as placed below the display screen 280. The input apparatus 200 is provided with input keys 210*a*-210*l* which are much the same as those in the aforementioned input apparatus 100.

The input apparatus 200 has the same configuration as the input apparatus 100 except that the input apparatus 200 has an input key 210*j* provided with an input item of "setting".

This input key 210*j* is provided with "♪" in the center and also with "setting" at the upward position HI. FIG. 8 shows a conversion table 52*j* corresponding to this input key 210*j*.

The conversion table 52*j* stores "transition into a setting mode" in correlation with "up" in the moving direction, as shown in FIG. 8. The symbol "♪" is stored in correlation with all the directions other than the moving direction "up". Here the "setting mode" means an operation mode in which the user rewrites to change the contents of the conversion table 52. Specifically, the operation will be described later with the flowchart of FIG. 10.

In the present embodiment, as described above, the conversion table 52*j* stores the mark indicating the change of the operation mode, in addition to the symbol after conversion in correlation with the moving directions, thereby realizing the transition into the operation mode of rewriting the contents of the conversion table 52*j*.

Figure 9:
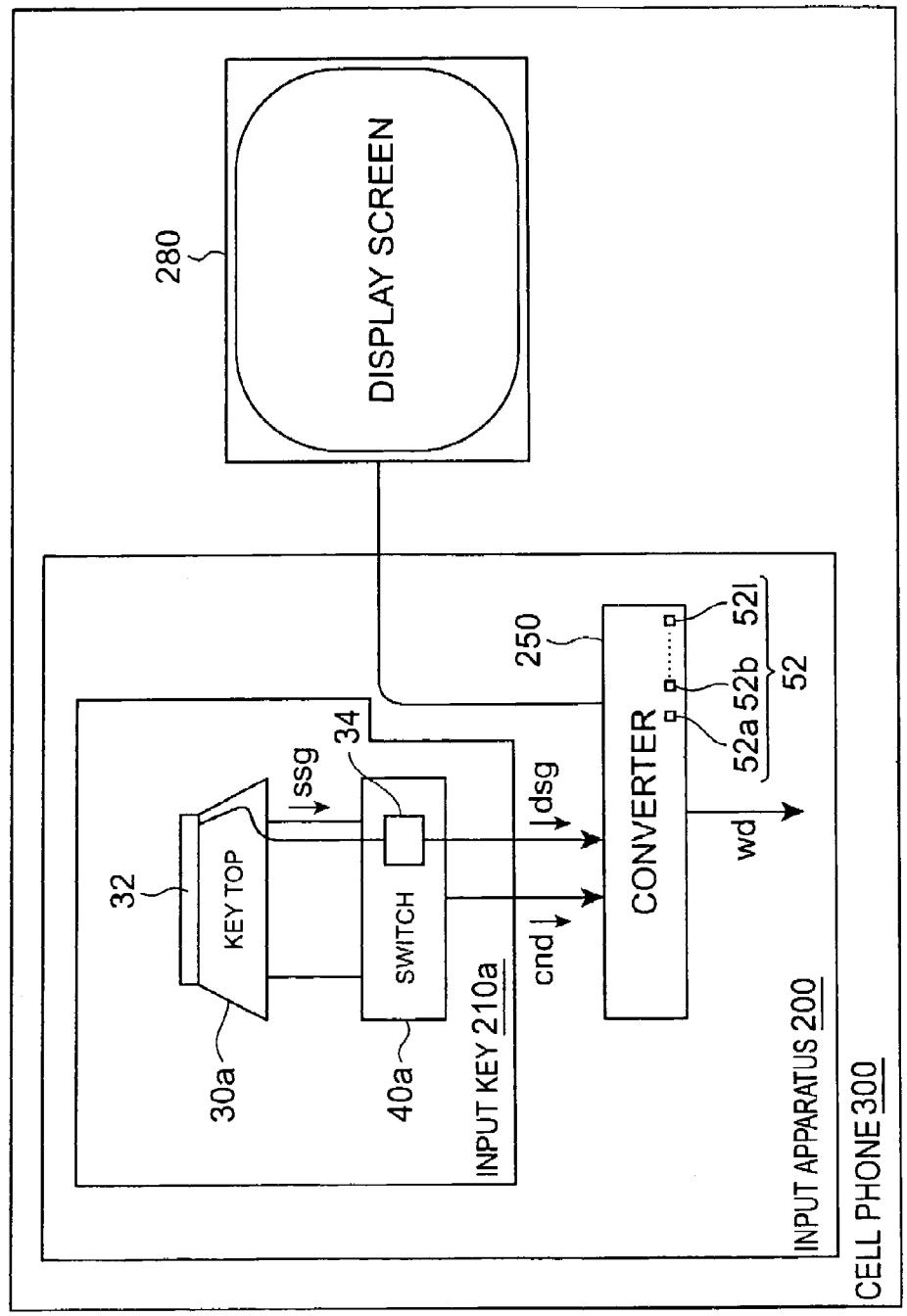
FIG. 9 is a functional block diagram showing a cell phone provided with the input apparatus according to the third embodiment.

FIG. 9 is a block diagram showing the input apparatus 200 and display screen 280 in the cell phone 300. FIG. 9 shows only the input key 210*a* for easier understanding of the invention, but the other input keys 210*b*-210*l* are also connected to the converter 250. The converter 250 is connected to the twelve input keys 210*a* to 210*l*.

As shown in FIG. 9, the input key 210*a* has a configuration similar to the input key 10*a* in FIG. 3. The other input keys 210*b*-210*l* are also constructed in similar structure. However, the converter 250 is different from the converter 50 in that it acts as a rewriting means for permitting the user to rewrite the conversion table 52 inside thereof and is connected to the display screen 280, in order to perform the rewriting operation in a quick and efficient manner. The operation mode in which the converter 250 rewrites the conversion table 52 will be referred to as a "setting mode", as described above.

Figure 10:
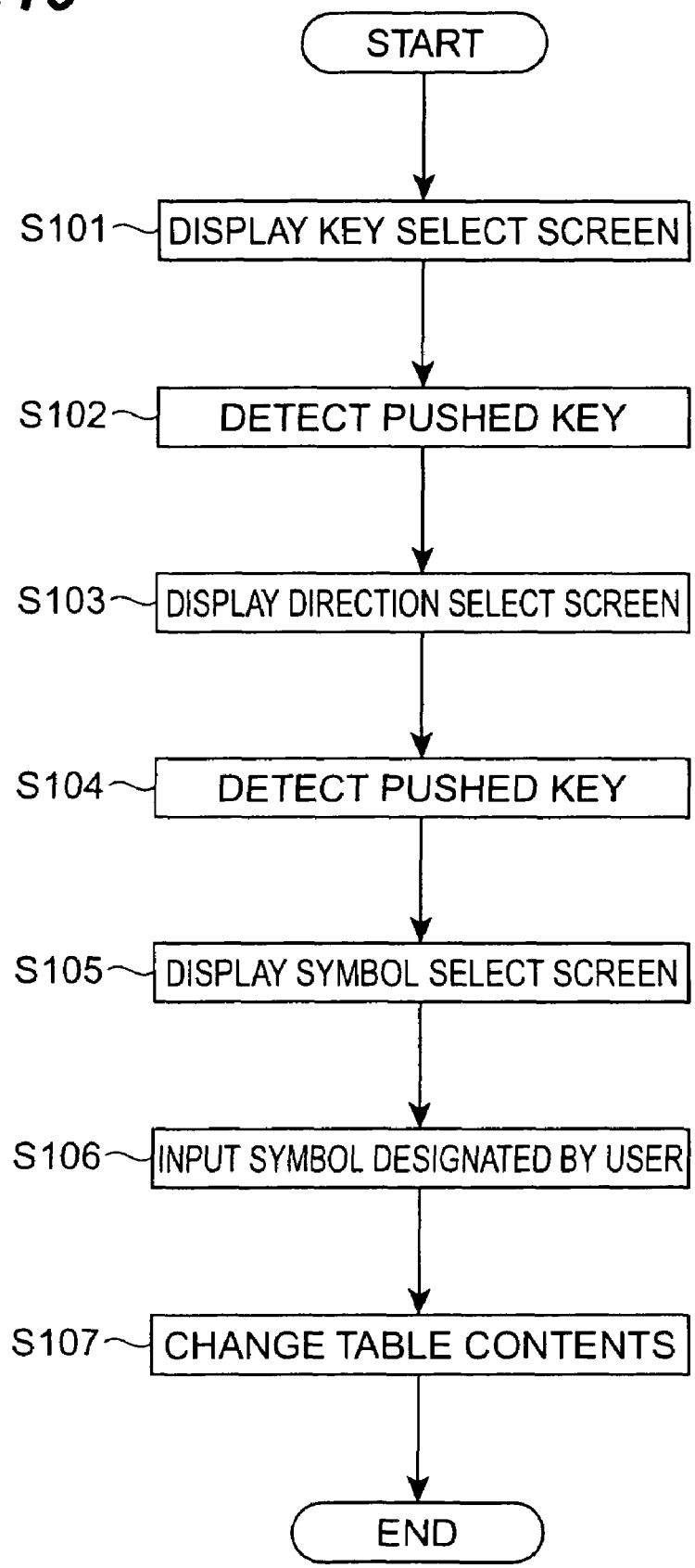
FIG. 10 is a flowchart showing an operation procedure of a converter shown in FIG. 9.

An operation procedure of the converter 250 will be described below with reference to the flowchart shown in FIG. 10. In FIG. 10 a step is also abbreviated to S. In the operation of the converter 250, the action in outputting a symbol to be inputted by the user is similar to that in the converter 50 in the first embodiment. In the operation of the converter 250, a peculiar action different from those of the converter 50 is an action in the setting mode in which the user rewrites the contents of the conversion table 52. FIG. 10 shows the operation in this setting mode.

In the present embodiment, the setting mode is started when the input key 210*j* is pushed while sliding a finger in the upward direction HI. Namely, with reference to the conversion table 52*j* corresponding to the input key 210*j*, the converter 250 acquires the "transition into the setting mode" as a symbol after conversion when the moving direction is "up". When the converter 250 detects the "transition into the setting mode", it makes a transition into the setting mode. FIG. 10 shows the operation after this transition.

Figure 11:
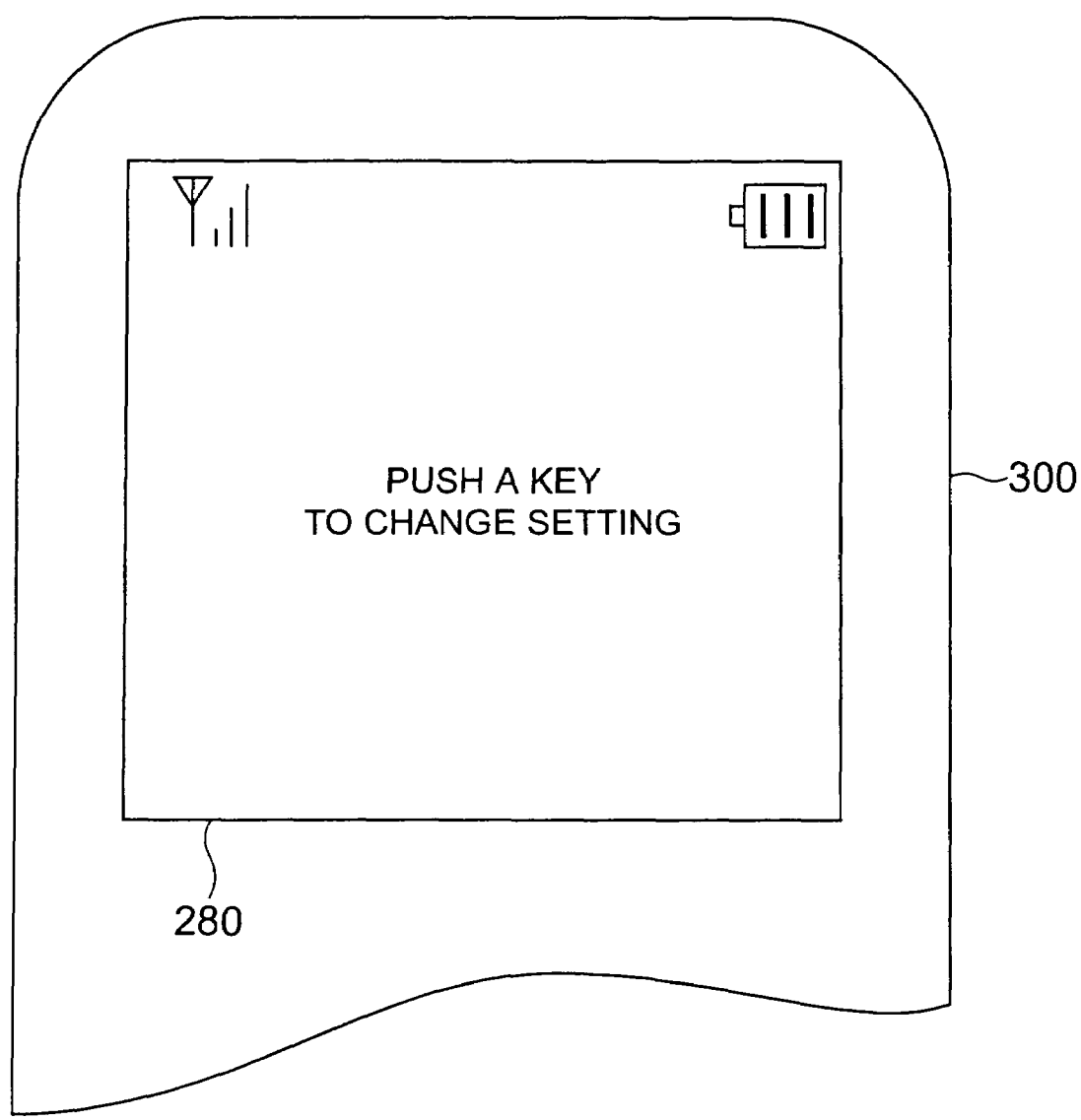
FIG. 11 is an illustration showing a state in which a message is displayed on a display screen shown in FIG. 9.

First, at step 101 after a start of processing, the converter 250, having made a transition into the setting mode, displays on the display screen 280 a message of "Push a key to change setting", in order to let the user select an input key 210 as a rewritten object among the conversion tables 52. FIG. 11 shows the display screen 280 displaying this message. The screen displaying this message will be referred to as a key select screen.

With reference to the key select screen, the user thus encouraged pushes one input key 210 to change setting. For example, supposing the user pushes the input key 210*k*, the converter 250 then detects the push of this input key 210*k* at subsequent step 102.

Then moving into step 103, the converter 250 displays on the display screen 280 a message of "Input a direction to change setting", in order to let the user input a direction as a rewritten object. This screen display will be referred to as a direction select screen.

On the occasion of displaying the direction select screen, it is preferable to provide a display for letting the user input a direction by use of an arrow key, (arrow input display), together with the aforementioned message. When the cell phone 300 has a so-called arrow key to permit the user to input one of four directions, this arrow key can be used to input a direction out of "up", "left", "right", "down", "center", and so on.

Figure 12:
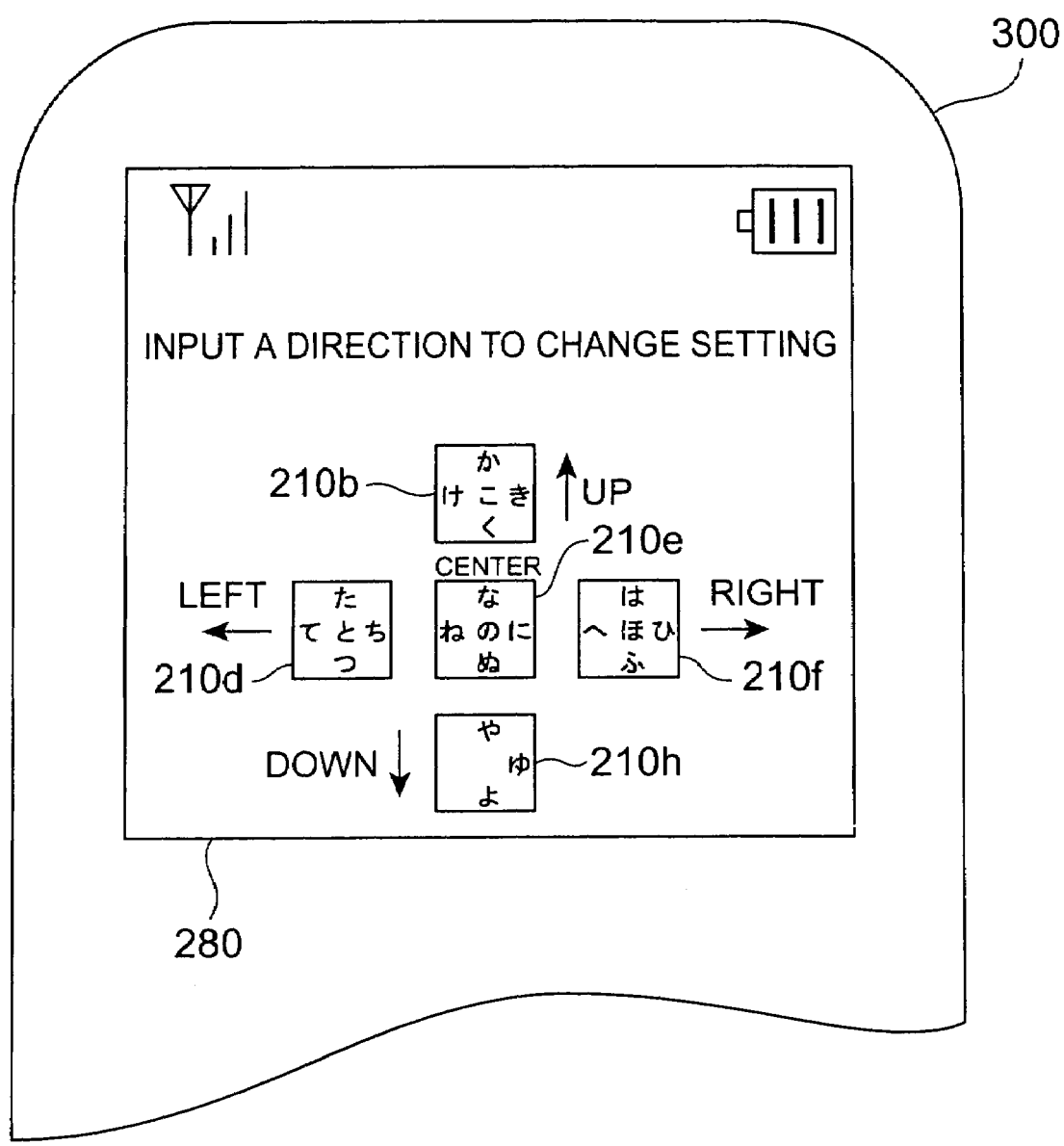
FIG. 12 is an illustration showing a state in which another message is displayed.

On the other hand, when the cell phone 300 has no arrow key, input keys 210 located in a cross pattern can be deemed as virtual arrow keys and the user is allowed to input a direction by pushing one of them. FIG. 12 shows the direction select screen displayed at step 103. As shown in FIG. 12, five keys are schematically displayed together with the message of "Input a direction to change setting", on the display screen 280. These five keys correspond to the input key 210b, input key 210d, input key 210e, input key 210f, and input key 210h. As shown in FIGS. 12 and 7, these keys are arranged in a cross pattern and thus can be deemed as arrow keys. Namely, the input key 210b represents "up", the input key 210d "left", and the input key 210e "center". Furthermore, the input key 210f represents "right", and the input key 210h "down". The user can input a direction to change setting, by pushing one of the input keys in accordance with the display on the screen.

When the user, as encouraged by the display on the direction select screen, inputs a direction to change setting, the converter 250 goes to step 104 to detect the input key 210 pushed by the user, to acquire the direction selected by the user.

Next, when going to the step 105, the converter 250 displays on the display screen 280, for example, a message of "Input a symbol", in order to let the user input a symbol to be set. This screen display will be referred to as a symbol select screen.

When the user, as encouraged by the display on the symbol select screen, inputs a symbol to be set, the converter goes to step 106 to display the symbol inputted by the user, on the display screen 280. In this case, the symbol input is carried out according to the procedure described in the first embodiment, but it may also be implemented by a combination with the conventional technique of designating a symbol by plural pushes on the input key.

Then the converter moves to step 107 to register the symbol inputted by the user, at the direction selected by the user, in the conversion table 52 corresponding to the input key inputted by the user in the above-described processing, to change the conversion table (or rewrite the conversion table). For example, in a case where the input key detected at step 102, i.e., the selected input key is the input key 210k and where the input key detected at step 104 is the input key 210b to select "up" as a direction, the symbol registered in the "up" box is changed in the conversion table 52k for the input key 210k. For example, supposing the symbol inputted by the user at step 106 is "@", "@" is registered in the "up" box in the conversion table 52k for the input key 210k. In consequence of this, when the input key 210k is pushed thereafter while sliding the finger tip or the like in the upward direction, "@" is entered. The input symbol may be a combination of plural marks such as "(^);" or the like.

As described above, the present embodiment permits the user to freely set the symbol assignment to the input keys, so that each user can change the symbol assignment to the input keys in a user-friendly manner. Accordingly, the user is provided with higher degrees of freedom for the input keys and input apparatus.

Fourth Embodiment

The third embodiment described the input keys 210 and input apparatus 200 permitting the user to freely set the contents of the conversion tables 52. Furthermore, the input keys 210 and input apparatus 200 are preferably configured to be able to automatically change the contents of the conversion tables 52 according to statistical results of input symbols. The present embodiment will describe a cell phone configured to automatically change the contents of the conversion tables.

The cell phone in the fourth embodiment is configured to tally statistics of input symbols and execute process a and process b below, based on the statistical results.

Process a: to assign a symbol with a higher input frequency to a direction easier to be pushed.

Process b: to assign a symbol with a higher input frequency to an input key easier to be pushed.

By executing these processes, it becomes easier to input a symbol with a higher input frequency, i.e., a frequently inputted symbol. For this reason, the symbol input becomes easier.

The cell phone in the present embodiment has much the same configuration and much the same operation as the cell phone 300 in the third embodiment.

The cell phone 300 in the present embodiment is characterized in that the conversion tables 52 are automatically rewritten by the process a and process b, in addition to the operation of the cell phone 300 in the third embodiment. Namely, the process a and process b are executed by rewriting of the conversion tables.

Figure 13:
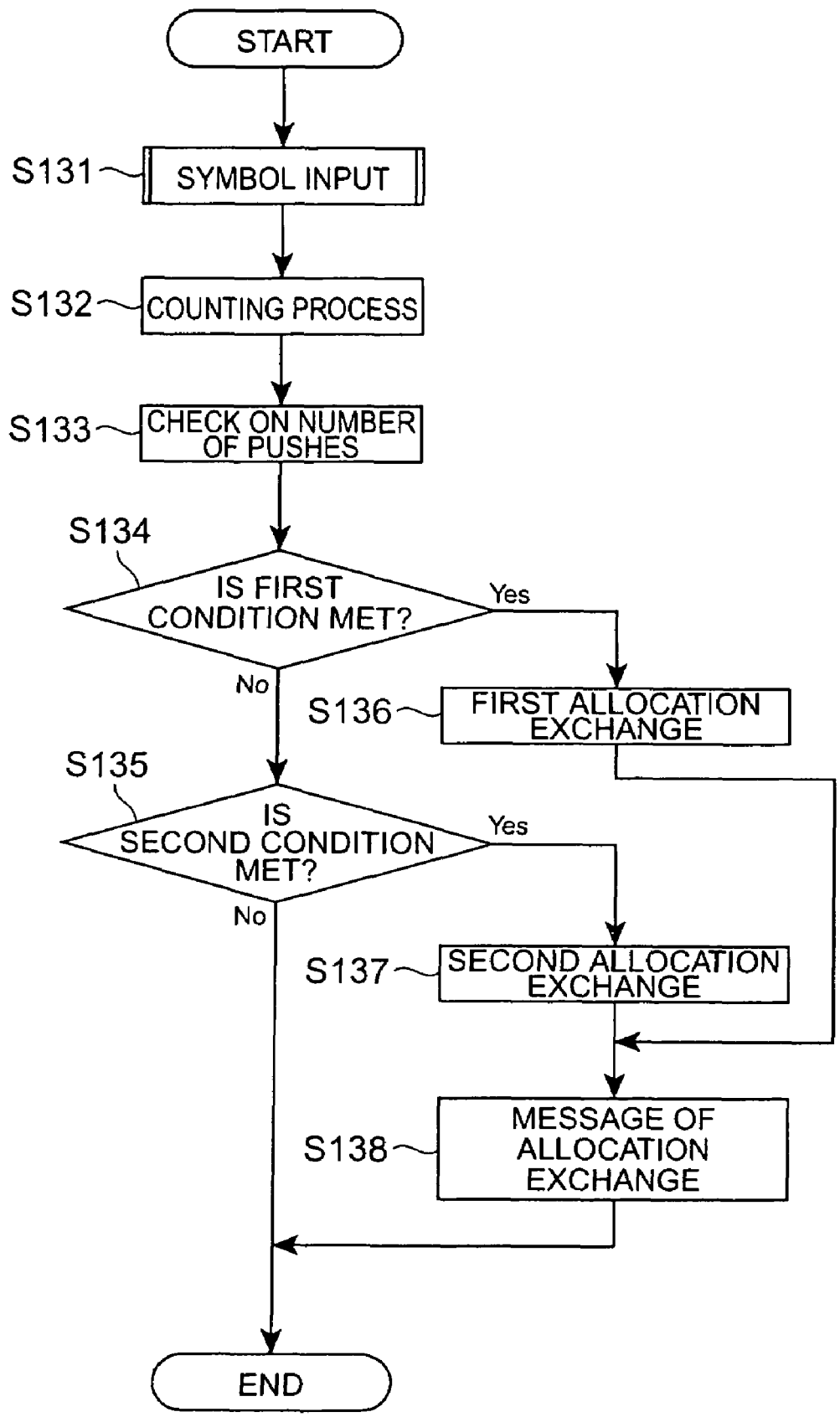
FIG. 13 is a flowchart showing an operation procedure of a converter in an input apparatus according to the fourth embodiment.

This rewriting operation of the conversion tables is executed by the converter 250. At this time, the converter 250 operates as a rewriting means for rewriting the conversion tables. FIG. 13 is a flowchart showing an operation procedure of the cell phone 300 where the converter 250 performs the rewriting of the conversion tables.

The operation procedure of the cell phone 300 in the present embodiment will be described below with focus on the operation procedure in the converter 250, on the basis of the flowchart shown in FIG. 13.

At step 131 after a start of the operation, the symbol input is carried out in the cell phone 300. The operation in this symbol input can be carried out according to the flowchart shown in FIG. 5, but it is also possible to adopt a combination of the operation shown in the flowchart of FIG. 5 with the conventional symbol input operation (the method of designating an input symbol by two or more pushes on a key).

When next moving to step 132, the converter 250 acts to execute a counting process. Namely, the converter 250 tallies input frequencies of symbols inputted by the user at step 131. Specifically, the converter 250 tallies input counts of respective input keys (and directions of finger slides) in a predetermined period and constructs a tally table 53 from the tally result. In this case, it is preferable to provide a semiconductor storage device inside the converter 250 and construct the tally table 53 in the semiconductor storage device. Such a semiconductor storage device is often called a RAM in general. The predetermined period for tally of input counts may be any period, and can be arbitrarily selected, for example, from periods of one hour to several days or the like.

FIG. 14 is a diagram showing an example of the tally table 53. As shown in FIG. 14, the tally table 53 is a table storing correlations among the input keys, finger slide directions, assigned symbols, and input counts. For example, as to the input key 210a, the symbol "お" is assigned to the direction of "still", and the input count of the symbol "お" is 100.

Concerning the input key 210l, the symbol "ん" is assigned to all the directions. Therefore, "ん" can be inputted by pushing the input key 210l with a slide of a finger or without a slide of a finger to be "still", and then the user must frequently input "ん" by the direction of "still". As a consequence, the input count of "still" stored is 250, which is larger than those in the other directions.

Then the converter 250 moves to step 133 to search the tally table 53 and check the input counts.

Then the converter 250 goes to step 134 to determine whether a condition below is met about the check result at the step 133. When the condition is met, the converter 250 proceeds to step 136. When the condition is not met, the converter 250 goes to step 135.

This condition (hereinafter referred to as a "first condition") is that conditions (1) and (2) below both be met.

(First Condition)
(1) Determined for an identical input key 210 are a direction to which a symbol with a largest input count (hereinafter referred to as a "most frequent symbol") is assigned (the direction will be referred to as a "most frequent symbol direction"), and a direction to which a symbol with a smallest input count (hereinafter referred to as a "least frequent symbol") is assigned (the direction will be referred to as a "least frequent symbol direction"), and the input counts in these two directions are two or more times different.
(2) The most frequent symbol direction is not a "direction easier to be pushed" than the least frequent symbol direction.

In order to determine whether the most frequent symbol direction is a "direction easier to be pushed" in condition (2), the converter 250 includes the following setting of rank orders of "easiness to be pushed" for the respective directions including "still".

Easiest to be pushed: "still"
Next easier to be pushed: "up"
Next easier to be pushed: "right" "left"
Hardest to be pushed: "down"

Since the present embodiment is described using the example of the cell phone 300, the rank orders of "easiness to be pushed" are set on the basis of the vertically long shape of the cell phone 300. The rank orders of "easiness to be pushed" are preferably set according to the shape and structure of the electronics device which incorporates the input apparatus 200.

When moving to step 136, the converter 250 exchanges the assignment of the least frequent symbol to the least frequent symbol direction for the assignment of the most frequent symbol to the most frequent symbol direction. Since this exchange of assignments (the exchange of the symbol assignments in the same input key will be referred to hereinafter as a "first assignment exchange") results in assigning a symbol with a larger input count to a direction easier to be pushed, it is feasible to achieve increase of efficiency of symbol input.

For example, in the tally table 53 shown in FIG. 14, as to the input key 210a, the input count of the symbol assigned to the direction "up" is 70, whereas the input count of the symbol assigned to the direction "down" is 150. Therefore, the input counts in the two directions is not less than two times different (the condition (1) is met) and the direction "down" is not a "direction easier to be pushed" than the direction "up" (the condition (2) is met); hence, the first condition at step 134 is met and the first assignment exchange ex1 is carried out at step 136. As a result of this first assignment exchange ex1, the conversion table 52a turns as shown in FIG. 15. Furthermore, in conjunction with this first assignment exchange ex1, the converter 250 also rewrites the contents of the tally table 53. The contents of the tally table 53 turn as shown in FIG. 16.

On the other hand, when the converter 250 moves to step 135, it determines whether a condition below is met as to the check result at step 133. When the condition is met, the converter moves to step 137. When the condition is not met, the converter 250 ends the rewriting of the conversion tables.

The condition herein (hereinafter referred to as a "second condition") is that condition (3) and condition (4) below both be met.

(Second Condition)
(3) Determined in the entire tally table are an input key 210 and a direction to which the most frequent symbol is assigned, and an input key 210 and a direction to which the least frequent symbol is assigned, and input counts in these two "input keys 210 and directions" are three or more times different.
(4) The input key 210 to which the most frequent symbol is assigned is not an "input key easier to be pushed" than the input key 210 to which the least frequent symbol is assigned.

The aforementioned first condition is a condition for execution of a symbol assignment exchange in the same input key 210, and the second condition is a condition for execution of a symbol assignment exchange between different input keys 210.

In order to determine whether the input key is an "input key easier to be pushed" in condition (2), the converter 250 includes the following setting of rank orders of "easiness to be pushed" for the respective input keys 210a-210l (positions thereof).

Easiest to be pushed: input key 210a, input key 210b, input key 210c
Next easier to be pushed: input key 210d, input key 210e, input key 210f
Next easier to be pushed: input key 210g, input key 210h, input key 210i
Hardest to be pushed: input key 210j, input key 210k, input key 210l Since the present embodiment is described using the example of the cell phone 300, the rank orders of "easiness to be pushed" for the input keys are set on the basis of the vertically long shape of the cell phone 300. The rank orders of "easiness to be pushed" are preferably set according to the shape and structure of the electronics device which incorporates the input apparatus 200.

When moving to step 137, the converter 250 exchanges the assignment of the symbol to the input key (and direction) to which the most frequent symbol is assigned, for the assignment of the symbol to the input key (and direction) to which the least frequent symbol is assigned. By this assignment exchange (the exchange of the assignments of symbols to the input keys (and directions) in the input apparatus 200 will be referred to hereinafter as a "second assignment exchange"), a symbol with a larger input count is assigned to an input key (and direction) easier to be pushed, thereby achieving increase of efficiency of symbol input.

In this case, the tally table 53 shown in FIG. 16 was already subjected to the first assignment exchange ex1 as the first condition was met; however, if the second condition is further met, it is also subject to the second assignment exchange ex2 at step 137.

For example, the most frequent symbol in the tally table 53 is "ん" and the input key and direction to which the most frequent symbol is assigned are "still" in the input key 210*l*. Furthermore, the least frequent symbol is "あ" and the input key and direction to which this least frequent symbol is assigned are "down" in the input key 210*a* (cf. FIG. 16). The input counts of the two symbols are 250 and 70, respectively, and thus the input counts have the three-fold difference (the condition (3) is met). In addition, the input key 210*l* to which the most frequent symbol is assigned is not an input key easier to be pushed than the input key 210*a* to which the least frequent symbol is assigned (the condition (4) is met). Therefore, the second condition is met at step 135 and the second assignment exchange ex2 is carried out at step 137.

The second assignment exchange ex2 is carried out in such a way that a processor or the like in the converter 250 rewrites the contents of the conversion tables 52. As a result of this second assignment exchange ex2, the contents of the conversion table 52*a* for the input key 210*a* turn to those as shown in FIG. 17, and the contents of the conversion table 52*l* for the input key 210*l* turn to those as shown in FIG. 17B. Furthermore, in conjunction with this second assignment exchange ex2, the converter 250 also rewrites the contents of the tally table 53. Accordingly, the contents of the tally table 53 turn as shown in FIG. 18.

In this manner, the cell phone 300 in the present embodiment is configured to automatically change the contents of the conversion tables 52, based on the input frequencies (input counts) in the predetermined period, and therefore the assignment of symbols to the input keys 210 (and directions thereof) can be changed to more efficient one. Accordingly, the user can execute the symbol input more efficiently. In addition, since this change is carried out based on the tally result in the predetermined period by the converter 250, there is no need for the user to perform any operation for the change.

When moving to step 138, the converter 250 displays the contents of the assignment exchanges. Specifically, the converter 250 displays on the display screen 280 the contents of the first assignment exchange ex1 and the second assignment exchange ex2 executed at steps 136 and 137 to notify the user of the contents of the assignment exchanges. By the display of the contents of the assignment exchanges, for example, the input keys 210 (and directions) subjected to the assignment exchanges are displayed on the display screen 280.

Through the display of the contents of the assignment exchanges, the user is allowed to know which symbols are assigned to the input keys 210 (and directions). For example, the user refers to this display and puts stickers indicating the new assignments on key tops 30 of the input keys 210, thereby surely securing a chance to adapt to the new assignments.

In this case, it can be contemplated that the key tops 30 are made of a transparent material and the user is allowed to place a sheet or the like indicating the symbol assignment, under the transparent material. It can also be contemplated that a liquid crystal display means or the like is provided in the surface of the key tops 30 and symbols assigned to the input keys 210 are displayed.

As described above, the present embodiment is arranged to automatically change the assignment of symbols to the input keys 210 and finger sliding directions. This change is carried out so as to assign a symbol with a larger input count or a higher input frequency to an input key 210 and direction easier to be pushed. For this reason, this automatic change of assignment achieves the cell phone 300 permitting easier execution of symbol input and permitting simpler symbol input.

Fifth Embodiment

Each of the above embodiments came up with the technology of inputting a symbol by a push with a slide of a finger in contact with the surface of the key top (which will be referred to hereinafter as "slide input"). It is, however, speculated that there are many cases where it is difficult to input all the symbols and marks by the slide input according to the present invention. For example, in the case of the ordinary cell phones or the like, the number of input keys is often 12 or so. This results from the relation with the dial keys and restrictions on the size of the housing or the like, and it is difficult to increase the number of input keys beyond measure. It is often difficult to input all the symbols and marks ranging from the symbols including the hiragana writing symbols, the katakana writing symbols, and the alphabet to the various marks of "#", "&", etc. by the slide input according to the present invention with such about twelve input keys.

For this reason, where the present invention is applied to the presently ordinary cell phones and the like, it is preferable to use the slide input according to the present invention in combination with the conventional input by plural pushes on a key (hereinafter referred to as "multiple push input").

In this case, it is preferable to allow the user to input the symbols such as the hiragana writing symbols with high input frequencies by the slide input according to the present invention. On the other hand, it is preferable to allow the user to input marks with low input frequencies (#, &, etc.) by the conventional multiple push input.

Even in the case where the hiragana writing symbols are inputted by the slide input, there are so-called "remainder" portions in the input keys. For example, as shown in FIG. 7, in the input key 210*k*, "を" is assigned to the direction "still", but no symbol is assigned to the other directions, which are thus so-called "remainder" directions (non-assigned directions).

It is preferable to assign some marks to such non-assigned directions. In this case, since there are numerous marks, it is preferable to assign marks with high input frequencies frequently used in the cell phones among them, to the non-assigned directions in the input key 210*k* and in the input key 210*l*.

Incidentally, in the case of the cell phones, for example, "★" and "@" among the marks have high frequencies of use, whereas "£", "Å", etc. are not so frequently used. Experience shows that the marks include those largely different in input frequency (frequency of use), as described above.

Accordingly, for example, as to the input key 210*k*, it is preferable to assign marks with high input frequencies frequently used such as "★", "@", "¥", and "#" (these marks will be referred to as "high-frequency marks"), to the non-assigned directions ("up", "right", "down", "left"). Furthermore, it is preferable to input marks with low input frequencies (frequencies of use) such as "%" and "Å" (these marks will be referred to as "low-frequency marks") by the multiple push input on the input key 210*l*.

The cell phone 300 in the fifth embodiment, when configured to perform the assignment of marks according to input frequencies (frequencies of use), is provided with a means for automatically changing the assignment of marks to the input keys 210 (and directions).

The cell phone 300 in the fifth embodiment tallies the statistics of input symbols (marks) and executes process c and process d below, based on the result of the statistics.
Process c: to include a high-frequency mark among objects that can be inputted by the slide input.
Process d: to exclude a low-frequency mark from objects that can be inputted by the slide input.

By executing the processes c, d, it becomes easier for the user to input a high-frequency mark with high input frequency, so that the symbol input becomes much easier.

The cell phone 300 in the fifth embodiment has much the same configuration and much the same operation as the cell phone 300 in the third embodiment.

The cell phone 300 in the present embodiment is characterized in that the contents of the conversion tables 52 are automatically rewritten by the process c and process d, in addition to the operation of the cell phone 300 in the third embodiment. Namely, the process c and process d are executed by rewriting of the conversion tables.

Figure 19:
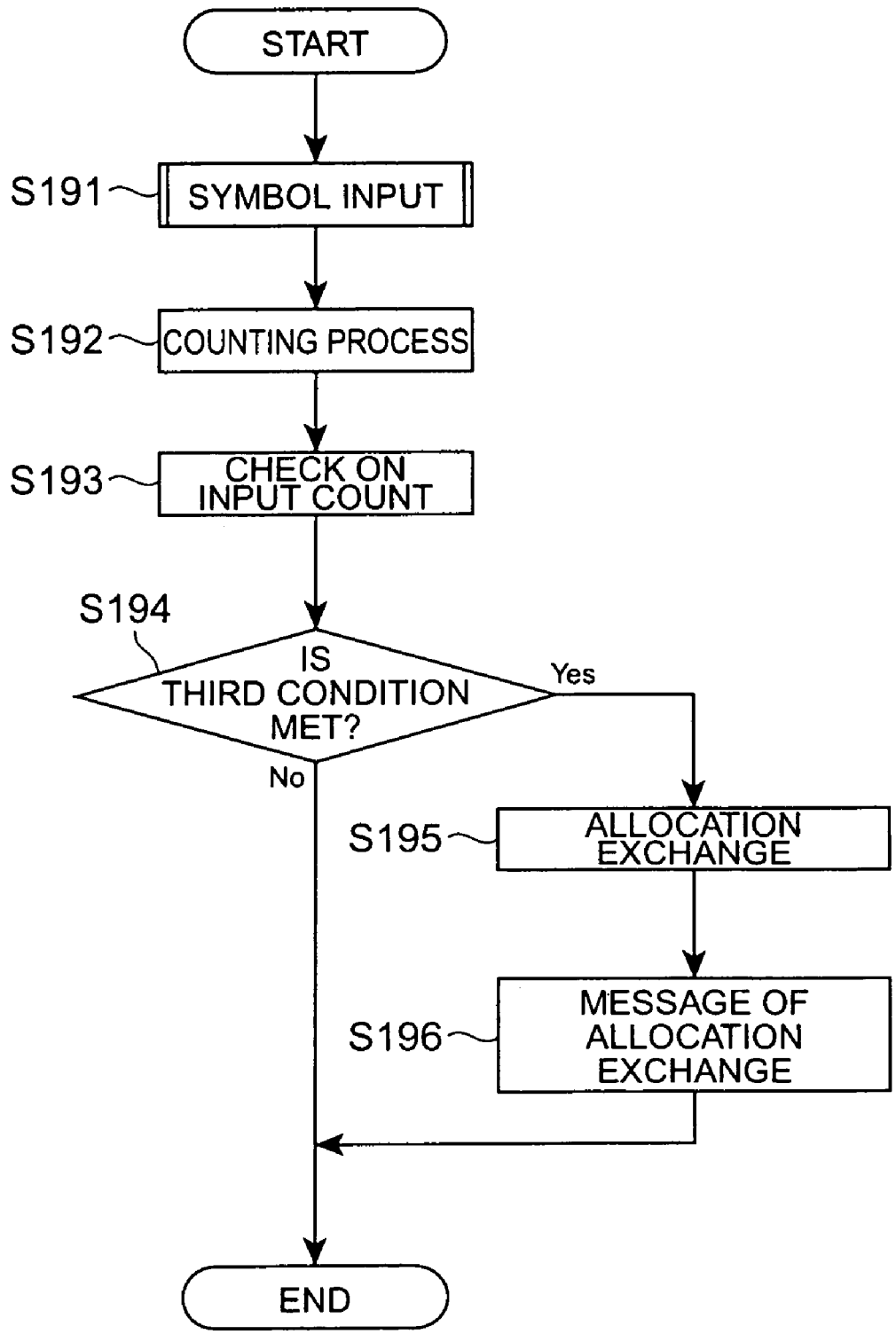
FIG. 19 is a flowchart showing an operation procedure of a converter in an input apparatus according to the fifth embodiment.

This rewriting of the conversion tables is executed by the converter 250. FIG. 19 is a flowchart showing an operation procedure of the cell phone 300 where the converter 250 performs the rewriting of the conversion tables.

The operation procedure of the cell phone 300 in the present embodiment will be described below with focus on the operation procedure in the converter 250, on the basis of the flowchart shown in this FIG. 19.

At step 191 after a start of the operation, a symbol or mark is inputted in the cell phone 300. The input of this symbol or mark is carried out by the operation at aforementioned step 131 in combination with the operation by the multiple push input.

When moving to step 192, the converter 250 operates to execute a counting process. Namely, the converter 250 tallies input counts of marks inputted by the user at step 191. Specifically, the converter 250 acts as a means for tallying the input counts of the input marks and constructs a mark tally table 54 as a result of tallying the input counts of the respective marks in a predetermined period. In a preferred configuration a semiconductor storage device is provided inside the converter 250 and the mark tally table 54 is constructed in the semiconductor storage device. The semiconductor storage device of this type is often called a RAM in general. The predetermined period for tally of input counts may be any period, and it can be arbitrarily selected, for example, from periods of one hour to several days or the like.

FIG. 20 is an illustration showing an example of the mark tally table 54. As shown in FIG. 20, the mark tally table 54 is a table in which marks, input keys, mark input methods, and input counts are stored in correlation with each other.

In the mark tally table 54, information according to (A) and (B) below is set in the mark input methods.
(A) One of "still", "up", "right", "down", and "left" is set for input of a mark by the slide input.
(B) The number of pushes is set for input of a mark by the multiple push input.

In the mark tally table 54 shown in FIG. 20, for example, the mark "#" is assigned to the mark input method "up" in the input key 210*k*. The mark "&" is assigned to the mark input method "right" in the input key 210*k*. Furthermore, the mark "@" is assigned to the mark input method "down" in the input key 210*k*.

On the other hand, since "£" has "5" registered in the mark input method of the input key 210*k*, it is set to be inputted by the conventional multiple push input. Namely, "£" is inputted by five pushes on the input key 210*k*. The mark "Å" has "6" registered in the mark input method of the input key 210*k*, and is thus set to be inputted by six pushes on the input key 210*k* by the conventional multiple push input.

It is seen from the mark tally table 54 shown in FIG. 20 that "#", "&", and "@" are inputted by the slide input and "£" and "Å" are inputted by the conventional multiple push input, as described above. Furthermore, it is also indicated that the input count of "#" is 120, the input count of "&" 12, and the input count of "@" 130. It is also shown that the input count of "£" is 130 and the input count of "Å" is 8.

Corresponding to this mark tally table 54, the conversion table 52*k* of the input key 210*k* has the contents as shown in FIG. 21. As shown in FIG. 21, "#" is assigned to "up" of the input key 210*k*, and "&" to "right". In addition, "@" is assigned to "down" of the input key 210*k*.

When moving to step 193, the converter 250 searches the mark tally table 54 to check the input count of each mark.

When moving to step 194, the converter 250 then determines whether a condition below is met, as to the check result at step 193. When the condition is met, the converter goes to step 195. When the condition is not met, the processing is terminated.

This condition (hereinafter referred to as a "third condition") is that a condition (5) below be met.

(Third Condition) (5) Determined are a mark with a smallest input count (hereinafter referred to as a "least frequent mark") among marks inputted by the slide input, and a mark with a largest input count (hereinafter referred to as a "most frequent mark") among marks inputted by the multiple push input. The condition is that the input count of the most frequent mark be two or more times greater than the input count of the least frequent mark.

In the mark tally table 54 shown in FIG. 20, the least frequent mark is "&" and the most frequent mark "£". The input counts of these marks are 12 and 130, respectively. Therefore, the third condition is met.

When moving to step 195, the converter exchanges the mark input methods of the most frequent mark and the least frequent mark (exchange ex3 of mark input methods). In the case of FIG. 20, this exchange ex3 of mark input methods results in registering "5" in the mark input method box of the mark "&", and "right" in that box of mark "£" (FIG. 20 shows a state before execution of this exchange ex3). FIG. 22 is an illustration showing the contents of the mark tally table 54 after execution of the exchange ex3 of mark input methods.

At step 195, in order to register the least frequent mark in place of the most frequent mark in the conversion table 52, the exchange of marks is carried out to rewrite the contents of the conversion table 52*k* for the input key 210*k*. Namely, the mark "£" is assigned in place of "&" to the "right" direction. FIG. 21 shows the conversion table 52*k* before execution of this mark assignment exchange and FIG. 23 the conversion table 52k after the execution of the mark assignment exchange.

Such rewriting of the mark tally table 54 and conversion table 52 is executed by the converter 250, and it is preferable to execute the rewriting by a processor in the converter 250. In a preferred configuration a semiconductor storage device is provided in the converter 250 and the mark tally table 54 is constructed in the semiconductor storage device.

The processor executes the operation in the fifth embodiment by executing a program stored in a semiconductor storage device. The semiconductor storage device to store the program is preferably a ROM. On the other hand, the semiconductor storage device to store the various tables is preferably a RAM.

Since the fifth embodiment is arranged to tally the input counts and register a high-frequency mark in place of a low-frequency mark in the conversion table from the tally result, it becomes feasible to input the high-frequency mark by the slide input being the feature of the present invention. Therefore, it is feasible to increase the efficiency in input of marks as well as symbols.

Furthermore, step 196 is to provide a message of an exchange of mark input methods by the exchange ex3 of mark input methods at step 195, thereby notifying the user of the exchange of mark input methods. Specifically, the converter 250 displays on the display screen 280 a mark subjected to the exchange of mark input methods and newly turned to a mark that can be inputted by the slide input, and an input key 210 and a direction thereof to which the mark is assigned.

Through the operation as described above, the user comes to know which mark is assigned to the input key 210 and direction. For example, the user refers to this display and puts a sticker indicating the new assignment, to the key top 30 of the input key 210, thereby securing a chance to adapt to the new assignment.

It is also contemplated that the key tops 30 are made of a transparent material and the user places a sheet or the like indicating assignment of symbols or marks under the transparent material. It is also preferable to provide a liquid crystal display means on the surface of the key tops 30 and to display symbols or marks assigned to the input keys 210.

As described above, the fifth embodiment is arranged to automatically change the input keys 210 and mark input methods. This change adjusts the conversion tables so as to input a high-frequency symbol by the slide input and input a low-frequency symbol by the conventional multiple push input.

Accordingly, it becomes feasible to input a high-frequency mark by a simpler operation, which achieves the effect of automatically obtaining the cell phone 300 permitting easier input of marks as well as symbols.

Figure 42:
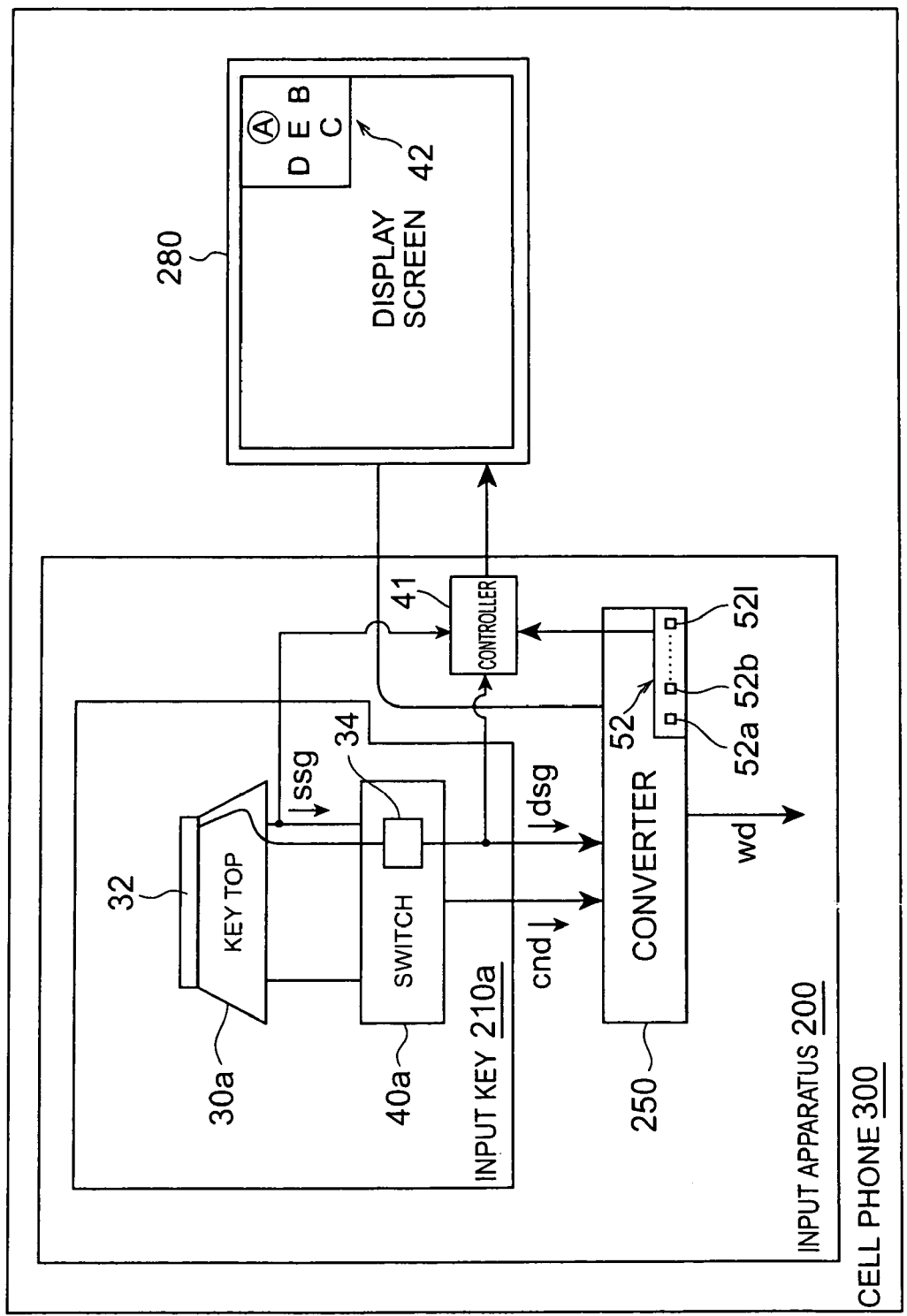
FIG. 42 is an illustration showing a configuration example provided with a feedback function to feed up-to-date information of conversion table back to a user.

Incidentally, each of the above embodiments is preferably configured to be able to feed the up-to-date information of the conversion tables about the input keys back to the user during the push operation on the input key by the user. A configuration with such feedback function of the up-to-date information of conversion tables to the user will be described below. FIG. 42 shows the configuration with the feedback function added to the configuration of FIG. 9. As shown in FIG. 42, the input apparatus 200 is further provided with a controller 41, and during a push operation on an input key (i.e., during a period from a start of the operation on the key top to confirmation of operation settlement by a switch) the controller 41 outputs to the display screen 280 information of the conversion table 52 about the input key at that time (information assigned to each direction) to highlight the input candidate information corresponding to the push operation at the present time on the display screen 280. For example, like an image 42 shown at the upper right corner of the display screen 280, it is feasible to feed back to the user such information that symbols A to E are assigned to the respective directions and that symbol "A" highlighted by a circle is presently selected.

The feedback is desirably carried out, for example, at a time of a change in assignment of plural input information elements to the input keys according to frequencies of use or the like, or at timing immediately after manipulation of the F key 162 in FIG. 32 (i.e., immediately after a mode changeover of symbol input) even without any change in assignment, and this achieves the three effects below. Namely, (1) in the case of a change in assignment of symbol information or the like to the input keys according to frequencies of use or the like, the user can check the up-to-date assignment information in the image 42 at the upper right corner of the display screen 280 during a push operation on the input key. (2) For example, in the case where, the input mode is switched from the input mode of the Japanese hiragana writing symbols to the alphabet input mode, the user can check the up-to-date assignment information of the different input mode, which is not easily indicated by only the display on the key top, in the image 42. Furthermore, (3) the user can also check in the image 42 the information as an input candidate corresponding to a push operation at that moment (information selected at the present time). This feedback function of the up-to-date assignment information can dramatically improve easiness and certainty of the user operation.

What is claimed is:

1. An input key to which a plurality of input information elements are assigned, the input key comprising:
   a key top to be pushed;
   moving direction detecting means for detecting a moving direction of a pusher of a finger or the like in contact with a surface of the key top during movement thereof across the key top surface,
   wherein projections to generate vibration or sound by contact with the pusher are formed in a plurality of predetermined regions on the key top surface, and
   wherein the moving direction detecting means comprises:
   measuring means for measuring a magnitude of vibration or sound generated from the projection in at least one predetermined region with movement of the pusher on the key top surface; and
   direction detecting means for detecting the moving direction of the pusher, based on the magnitude of the vibration or sound obtained by the measurement.

2. An input key to which a plurality of input information elements are assigned, the input key comprising:
   a key top to be pushed;
   moving direction detecting means for detecting a moving direction of a pusher of a finger or the like in contact with a surface of the key top during movement thereof across the key top surface,
   wherein projections to generate vibration or sound by contact with the pusher are formed in a plurality of predetermined regions on the key top surface,
   wherein back projections to generate vibration or sound due to the vibration or sound generated by the projections are formed in regions corresponding to the predetermined regions, in a back surface of the key top, wherein the back projections in the respective regions are configured to have mutually different natural frequencies of generated vibration or sound, and wherein the moving direction detecting means comprises:

measuring means for measuring a natural frequency of vibration or sound generated from the back projection in at least one region due to vibration or sound generated from the projection in at least one predetermined region with movement of the pusher on the key top surface; and direction detecting means for detecting the moving direction of the pusher, based on the natural frequency obtained by the measurement.

3. An input apparatus for inputting information by an input key to which a plurality of input information elements are assigned, the input apparatus comprising:

the input key comprising a key top to be pushed;

moving direction detecting means for detecting a substantially lateral moving direction of a pusher of a finger or the like in contact with a surface of the key top during movement thereof across the key top surface;

converting means for converting a state of the switch and the moving direction detected by the moving direction detecting means, into input information; and further comprising a plurality of said input keys, wherein the converting means comprises conversion tables provided for the respective input keys and each storing a correlation of the moving direction of the pusher with the input information, and rewriting means for rewriting the conversion tables.

4. An input apparatus for inputting information by an input key to which a plurality of input information elements are assigned, the input apparatus comprising:

the input key comprising a key top to be pushed;

moving direction detecting means for detecting a moving direction of a pusher of a finger or the like in contact with a surface of the key top during movement thereof across the key top surface;

converting means for converting a state of the switch and the moving direction detected by the moving direction detecting means, into input information; and further comprising a plurality of said input keys, wherein the converting means comprises conversion tables provided for the respective input keys and each storing a correlation of the moving direction of the pusher with the input information;

tallying means for tallying an input count of input information; and rewriting means for rewriting the conversion tables so that when a tally result of the input count by the tallying means is that an input count of first information assigned to a first moving direction of a first input key is larger than an input count of second information assigned to a second moving direction of a second input key easier to be pushed than the first moving direction of the first input key, the first information is assigned to the second moving direction of the second input key.

5. An input apparatus for inputting information by an input key to which a plurality of input information elements are assigned, the input apparatus comprising:

the input key comprising a key top to be pushed;

moving direction detecting means for detecting a moving direction of a pusher of a finger or the like in contact with a surface of the key top during movement thereof across the key top surface;

converting means for converting a state of the switch and the moving direction detected by the moving direction detecting means, into input information; and further comprising a plurality of said input keys, wherein the converting means comprises conversion tables provided for the respective input keys and each storing a correlation of the moving direction of the pusher with the input information;

tallying means for tallying an input count of input information; and registering means for performing such registration that when a tally result of the input count by the tallying means is that an input count of third information not registered on the conversion tables is larger than an input count of fourth information registered on the conversion tables, the third information is registered instead of the fourth information on the conversion tables.

6. An input apparatus for inputting information by an input key to which a plurality of input information elements are assigned, the input apparatus comprising:

the input key comprising: a key top to be pushed;

position detecting means for detecting a push position on a surface of the key top of a pusher of a finger or the like used to push the key top;

moving direction detecting means for detecting a moving direction of the pusher during movement of the pusher across the key top surface, based on a change of the push position of the pusher detected by the position detecting means; and converting means for converting a state of the switch and the moving direction detected by the moving direction detecting means, into input information; and further comprising a plurality of said input keys, wherein the converting means comprises conversion tables provided for the respective input keys and each storing a correlation of the moving direction of the pusher with the input information, and rewriting means for rewriting the conversion tables.

7. An input apparatus for inputting information by an input key to which a plurality of input information elements are assigned, the input apparatus comprising:

the input key comprising: a key top to be pushed;

position detecting means for detecting a push position on a surface of the key top of a pusher of a finger or the like used to push the key top;

moving direction detecting means for detecting a moving direction of the pusher during movement of the pusher across the key top surface, based on a change of the push position of the pusher detected by the position detecting means; and converting means for converting a state of the switch and the moving direction detected by the moving direction detecting means, into input information; and further comprising a plurality of said input keys, wherein the converting means comprises conversion tables provided for the respective input keys and each storing a correlation of the moving direction of the pusher with the input information;

tallying means for tallying an input count of input information; and rewriting means for rewriting the conversion tables so that when a tally result of the input count by the tallying means is that an input count of first information assigned to a first moving direction of a first input key is larger than an input count of second information assigned to a second moving direction of a second input key easier to be pushed than the first moving direction of the first input key, the first information is assigned to the second moving direction of the second input key.

8. An input apparatus for inputting information by an input key to which a plurality of input information elements are assigned, the input apparatus comprising:

the input key comprising: a key top to be pushed;

position detecting means for detecting a push position on a surface of the key top of a pusher of a finger or the like used to push the key top;

moving direction detecting means for detecting a moving direction of the pusher during movement of the pusher across the key top surface, based on a change of the push position of the pusher detected by the position detecting means; and converting means for converting a state of the switch and the moving direction detected by the moving direction detecting means, into input information; and further comprising a plurality of said input keys, wherein the converting means comprises conversion tables provided for the respective input keys and each storing a correlation of the moving direction of the pusher with the input information;

tallying means for tallying an input count of input information; and registering means for performing such registration that when a tally result of the input count by the tallying means is that an input count of third information not registered on the conversion tables is larger than an input count of fourth information registered on the conversion tables, the third information is registered instead of the fourth information on the conversion tables.

* * * * *